United States Patent
Storch et al.

(10) Patent No.: US 8,260,471 B2
(45) Date of Patent: Sep. 4, 2012

(54) ENERGY DISTRIBUTION MANAGEMENT SYSTEM

(75) Inventors: Randy S. Storch, Highland Park, IL (US); Scott M. Kordik, West Dundee, IL (US); Joe B. Doran, Round Rock, TX (US); Matthew Banach, Gurnee, IL (US)

(73) Assignee: Herman Miller, Inc., Zeeland, MI (US)

( * ) Notice: Subject to any disclaimer, the term of this patent is extended or adjusted under 35 U.S.C. 154(b) by 38 days.

(21) Appl. No.: 13/060,817

(22) PCT Filed: Aug. 27, 2009

(86) PCT No.: PCT/US2009/055261
§ 371 (c)(1),
(2), (4) Date: Mar. 30, 2011

(87) PCT Pub. No.: WO2010/025307
PCT Pub. Date: Mar. 4, 2010

(65) Prior Publication Data
US 2011/0184581 A1    Jul. 28, 2011

Related U.S. Application Data

(60) Provisional application No. 61/092,235, filed on Aug. 27, 2008.

(51) Int. Cl.
*G05D 3/12*        (2006.01)
*G05D 5/00*        (2006.01)
*G05D 9/00*        (2006.01)
*G05D 11/00*       (2006.01)
*G08B 23/00*       (2006.01)
*H04L 27/04*       (2006.01)
*H01H 47/00*       (2006.01)

(52) U.S. Cl. .......... 700/295; 700/297; 700/286; 700/22; 340/870.02; 375/310; 307/132 E

(58) Field of Classification Search ............ 700/295, 700/297, 286, 22; 340/870.02; 375/310; 307/132 E
See application file for complete search history.

(56) References Cited

U.S. PATENT DOCUMENTS

| | | |
|---|---|---|
| 4,850,009 A | 7/1989 | Zook et al. |
| 5,131,019 A | 7/1992 | Sheffer et al. |
| 5,191,265 A | 3/1993 | D'Aleo et al. |

(Continued)

FOREIGN PATENT DOCUMENTS

WO    2006026648    3/2006

OTHER PUBLICATIONS

International Search Report and Written Opinion mailed Oct. 22, 2009 in International Application Number in PCT/US09/55261.

(Continued)

*Primary Examiner* — Charles Kasenge
*Assistant Examiner* — Jason Lin
(74) *Attorney, Agent, or Firm* — Plumsea Law Group, LLC

(57) ABSTRACT

An energy management system (400) includes a series of smart devices (404) connected through a network system communications bus (402). The smart devices (404) are connected to loads (408) and include energy monitor boards (448) and a core board (450) for monitoring energy consumption of the loads (408) and transmitting the energy consumption data to a gateway (410).

20 Claims, 11 Drawing Sheets

U.S. PATENT DOCUMENTS

| | | | |
|---|---|---|---|
| 5,214,889 A | 6/1993 | Nienhuis et al. | |
| 6,070,840 A | 6/2000 | Kelley et al. | |
| 6,182,130 B1 | 1/2001 | Dolin, Jr. et al. | |
| 6,196,467 B1 | 3/2001 | Dushane et al. | |
| 6,211,627 B1 | 4/2001 | Callahan | |
| 6,338,009 B1 * | 1/2002 | Sato et al. | 700/286 |
| 6,353,861 B1 | 3/2002 | Dolin, Jr. et al. | |
| 7,163,263 B1 | 1/2007 | Kurrasch et al. | |
| 7,207,629 B2 | 4/2007 | Goetz et al. | |
| 7,277,930 B2 | 10/2007 | Hillis et al. | |
| 7,356,385 B2 | 4/2008 | Lenarduzzi et al. | |
| 7,369,060 B2 | 5/2008 | Veskovic et al. | |
| 7,393,053 B2 | 7/2008 | Kurrasch et al. | |
| 7,460,930 B1 | 12/2008 | Howell et al. | |
| 7,541,941 B2 | 6/2009 | Bogolea et al. | |
| 7,690,317 B2 | 4/2010 | Beck et al. | |
| 7,735,918 B2 | 6/2010 | Beck | |
| 2002/0072868 A1 | 6/2002 | Bartone et al. | |
| 2002/0193912 A1 * | 12/2002 | Hamad et al. | 700/291 |
| 2003/0139939 A1 * | 7/2003 | Spool et al. | 705/1 |
| 2003/0176952 A1 | 9/2003 | Collins et al. | |
| 2004/0124338 A1 * | 7/2004 | Cloutier et al. | 250/214 C |
| 2004/0193329 A1 * | 9/2004 | Ransom et al. | 700/286 |
| 2004/0256524 A1 | 12/2004 | Beck et al. | |
| 2005/0029849 A1 | 2/2005 | Goetz et al. | |
| 2005/0201080 A1 * | 9/2005 | Seward | 362/97 |
| 2006/0259332 A1 | 11/2006 | Brown | |
| 2007/0043478 A1 * | 2/2007 | Ehlers et al. | 700/276 |
| 2007/0108809 A1 | 5/2007 | Kurrasch et al. | |
| 2007/0135086 A1 * | 6/2007 | Stanford | 455/402 |
| 2007/0255461 A1 * | 11/2007 | Brickfield et al. | 700/295 |
| 2008/0051945 A1 * | 2/2008 | Kates | 700/295 |
| 2008/0077368 A1 | 3/2008 | Nasle | |
| 2008/0088180 A1 | 4/2008 | Cash et al. | |
| 2008/0103635 A1 * | 5/2008 | Vuk et al. | 700/300 |
| 2008/0114811 A1 | 5/2008 | Murdoch | |
| 2008/0168283 A1 | 7/2008 | Penning | |
| 2008/0172312 A1 | 7/2008 | Synesiou et al. | |
| 2008/0183337 A1 * | 7/2008 | Szabados | 700/296 |
| 2008/0185977 A1 | 8/2008 | Veskovic et al. | |
| 2008/0211684 A1 | 9/2008 | Beck | |
| 2009/0005912 A1 * | 1/2009 | Srivastava et al. | 700/276 |
| 2009/0193217 A1 | 7/2009 | Korecki et al. | |
| 2010/0076617 A1 * | 3/2010 | Van Den Keybus et al. | 700/297 |
| 2010/0207434 A1 | 8/2010 | Kurrasch et al. | |

OTHER PUBLICATIONS

International Preliminary Report on Patentability (including Written Opinion of the ISA) mailed Mar. 10, 2011 in International Application No. PCT/US2009/055261.

* cited by examiner

| ZONE PROPERTIES: | | | | | |
|---|---|---|---|---|---|
| NAME AND PATH: | /TOP LEVEL/ | | | | |
| CONTENTS: | 3 ZONES, 4 DEVICES | | | | |
| KILOWATT/HOURS: | 0.000000 | | | | |
| AVERAGE LOAD: | 0% | | | | |
| ZONE CONTENTS | MAX LOAD | USER STATUS | ACT STATUS | | KWH |
| ☐ 🗁 DIMMER | | | 0% | | 0.000000 |
| ☐ 🗁 120_277 | | | 0% | | 0.000000 |
| ☐ 🗁 RELAY | | | 0% | | 0.000000 |
| ☐ 🗋 DIMMER | 100% | 0% | 0% | | 0.000000 |
| ☐ 🗋 120_277 | 100% | 0% | 0% | | 0.000000 |
| ☐ 🗋 00:11:08 | 100% | 0% | 0% | | 0.000000 |
| ☐ 🗋 00:10:CO | 100% | 0% | 0% | | 0.000000 |
| CHECK ALL | UNCHECK ALL | TURN ON | TURN OFF | DIM TO | DIM BY | 0% ▽ |

FIG. 4

| /TOP LEVEL/DIMMER | |
|---|---|
| HARDWARE TYPE: | DIMMER |
| KILOWATT/HOURS: | 0.000000 |
| USER LOAD LEVEL: | 0% |
| ACTUAL LOAD LEVEL: | 0% |
| ENERGY PROPERTIES | |
| FULL POWER WATTS DRAWN: | 100 ▽ |
| LOAD SHEDDING GROUP: | GROUP 1 ▽ |
| LOAD SHEDDING GAIN: | 1-SLOWEST ▽ |
| DIM LOAD BY: | SETTING DIM LEVEL ▽ |
| MAX LOAD SETTING: | 100% ▽ |
| MIN LOAD SETTING: | 0% ▽ |
| | SAVE CANCEL |

ENERGY DISTRIBUTION MANAGEMENT SYSTEM

CROSS-REFERENCE TO RELATED APPLICATIONS

This application is a national stage application of International Application No. PCT/US2009/55261, filed Aug. 27, 2009, which claims priority to and is based on U.S. Provisional Patent Application Ser. No. 61/092,235, filed Aug. 27, 2008, both of which are herein incorporated by reference in their entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND OF THE INVENTION

1. Field of the Invention

The invention relates to concepts associated with energy management systems and, more particularly, to means for providing remote communications associated with management of functions such as load balancing, load shedding and the like.

2. Background Art

A significant amount of work is currently being performed in technologies associated with control of what can be characterized as "environmental" systems. Such systems may be utilized in commercial and industrial buildings, residential facilities, transportation systems and other environments. Control functions may vary from relatively conventional HVAC temperature control to extremely sophisticated systems for control of the entirety of a city's subway complex.

Development is also being undertaken in the field of network technologies for controlling environmental systems. References are often made in current literature to "smart" buildings or rooms having automated and centralized environmental functionality. This technology provides for networks controlling a number of separate and independent functions, including temperature, lighting and the like.

There are a number of issued patents directed to various aspects of control of environmental systems. For example, Callahan, U.S. Pat. No. 6,211,627 B1 issued Apr. 3, 2001 discloses lighting systems specifically directed to entertainment and architectural applications. The Callahan lighting systems include apparatus which provide for distribution of electrical power to a series of branch circuits, with the apparatus being reconfigurable so as to place the circuits in a dimmed or "not-dimmed" state, as well as a single or multi-phase state. Callahan further discloses the concept of encoding data in a form detectable in electrical load wiring and at the load. The data may include dimmer identification, assigned control channels, descriptive load information and remote control functionality. For certain functions, Callahan also discloses the use of a handheld decoder.

D'Aleo et al., U.S. Pat. No. 5,191,265 issued Mar. 2, 1993 disclose a wall-mounted lighting control system. The system may include a master control module, slave modules and remote control units. The system is programmable and modular so that a number of different lighting zones may be accommodated. D'Aleo et al. also disclose system capability of communicating with a remote "power booster" for purposes of controlling heavy loads.

Dushane et al., U.S. Pat. No. 6,196,467 B1 issued Mar. 6, 2001 disclose a wireless programmable thermostat mobile unit for controlling heating and cooling devices for separate occupation zones. Wireless transmission of program instructions is disclosed as occurring by sonic or IR communication.

Other patent references disclose various other concepts and apparatus associated with control systems in general, including use of handheld or other remote control devices. For example, Zook et al., U.S. Pat. No. 4,850,009 issued Jul. 18, 1989 disclose the use of a portable handheld terminal having optical barcode reader apparatus utilizing binary imaging sensing and an RF transceiver. Sheffer et al., U.S. Pat. No. 5,131,019 issued Jul. 14, 1992 disclose a system for interfacing an alarm reporting device with a cellular radio transceiver. Circuitry is provided for matching the format of the radio transceiver to that of the alarm reporting unit. Dolin, Jr. et al., U.S. Pat. No. 6,182,130 B1 issued Jan. 30, 2001 disclose specific apparatus and methods for communicating information in a network system. Network variables are employed for accomplishing the communication, and allow for standardized communication of data between programmable nodes. Connections are defined between nodes for facilitating communication, and for determining addressing information to allow for addressing of messages, including updates to values of network variables. Dolin, Jr. et al., U.S. Pat. No. 6,353,861 B1 issued Mar. 5, 2002 disclose apparatus and methods for a programming interface providing for events scheduling, variable declarations allowing for configuration of declaration parameters and handling of I/O objects.

Although a number of the foregoing references describe complex programming and hardware structures for various types of environmental control systems, it is desirable for certain functions associated with environmental control to be readily useable by the layperson. This is particularly true at a specific location, where it may be desirable to readily initially configure or reconfigure relationships or "correlation" between, for example, switching devices and lighting apparatus. Also, it may be desirable for such capability of initial configuration or reconfiguration to preferably occur within the proximity of the switching and lighting apparatus, rather than at a centralized or other remote location.

In addition to the foregoing, particular attention is being directed to energy conservation. In this regard, reviews are currently being undertaken with respect to time periods and quantities of power which are used in various types of residential, commercial and industrial facilities. For example, it would be desirable to be able to determine target values for power consumption within a total facility, and be able to adjust energy transmissions based on an "as needed" basis, so as to maintain power consumption at a specific level, or otherwise within a specific tolerance window.

BRIEF DESCRIPTION OF THE SEVERAL VIEWS OF THE DRAWING

FIG. 4 is a screen shot showing an example screen for indicating contents of a load zone, power utilized and the like;

FIG. 5 is a further screen shot showing an example of data stored and determined in real time for a particular dimmer;

FIG. 6 is a screen shot showing an example screen for adding a load shedding function;

FIG. 7 is a further screen shot directed to load shedding, showing an example screen for adding an additional load shedding goal;

FIG. 8 is another screen shot directed to the load shedding function, showing an example screen for editing load shedding trigger properties;

DETAILED DESCRIPTION OF THE INVENTION

Figure 1:
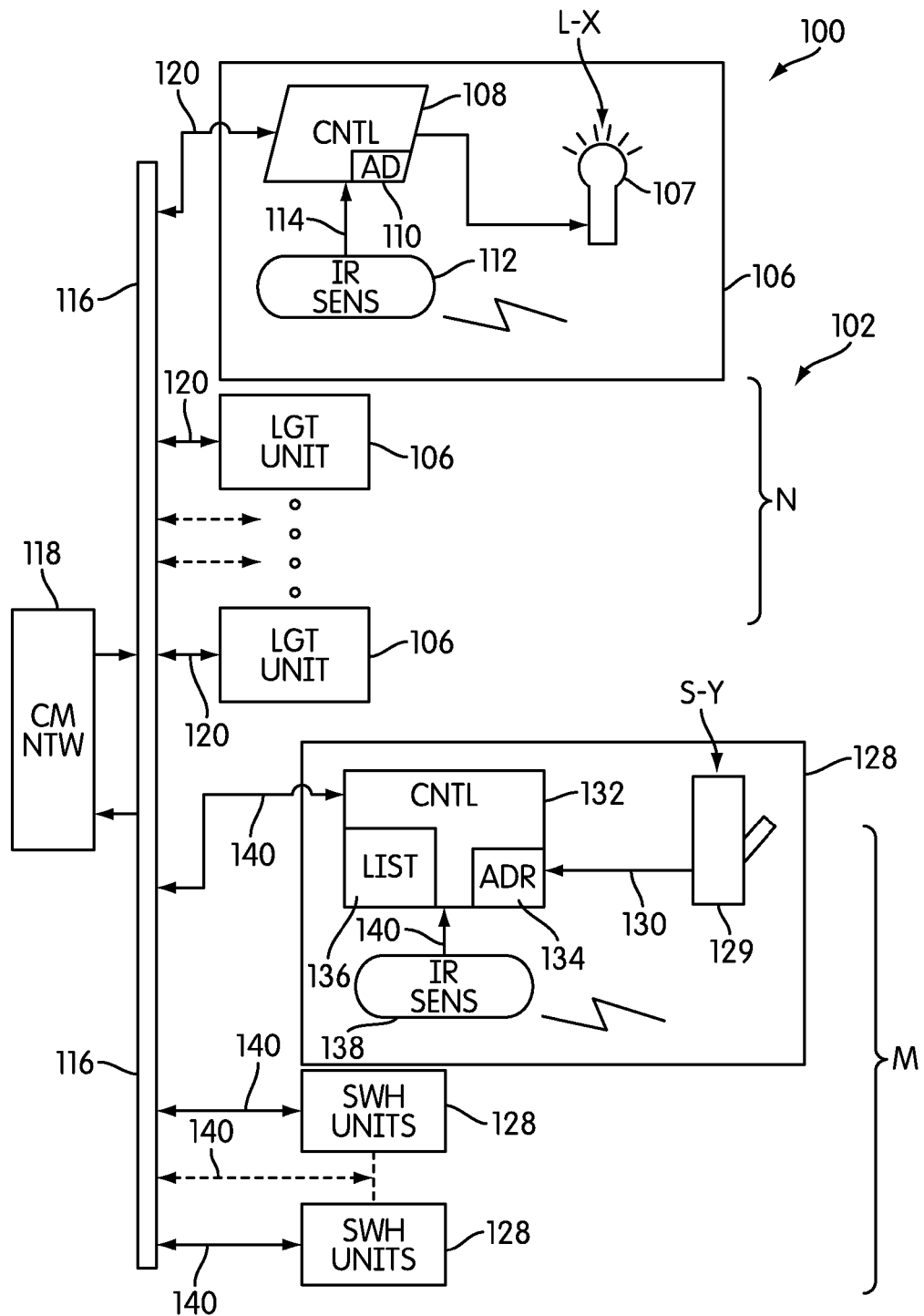
FIG. 1 illustrates an example embodiment of a communications network in accordance with the invention, showing details in block diagram format of a lighting unit and a switch unit.
Figure 3:
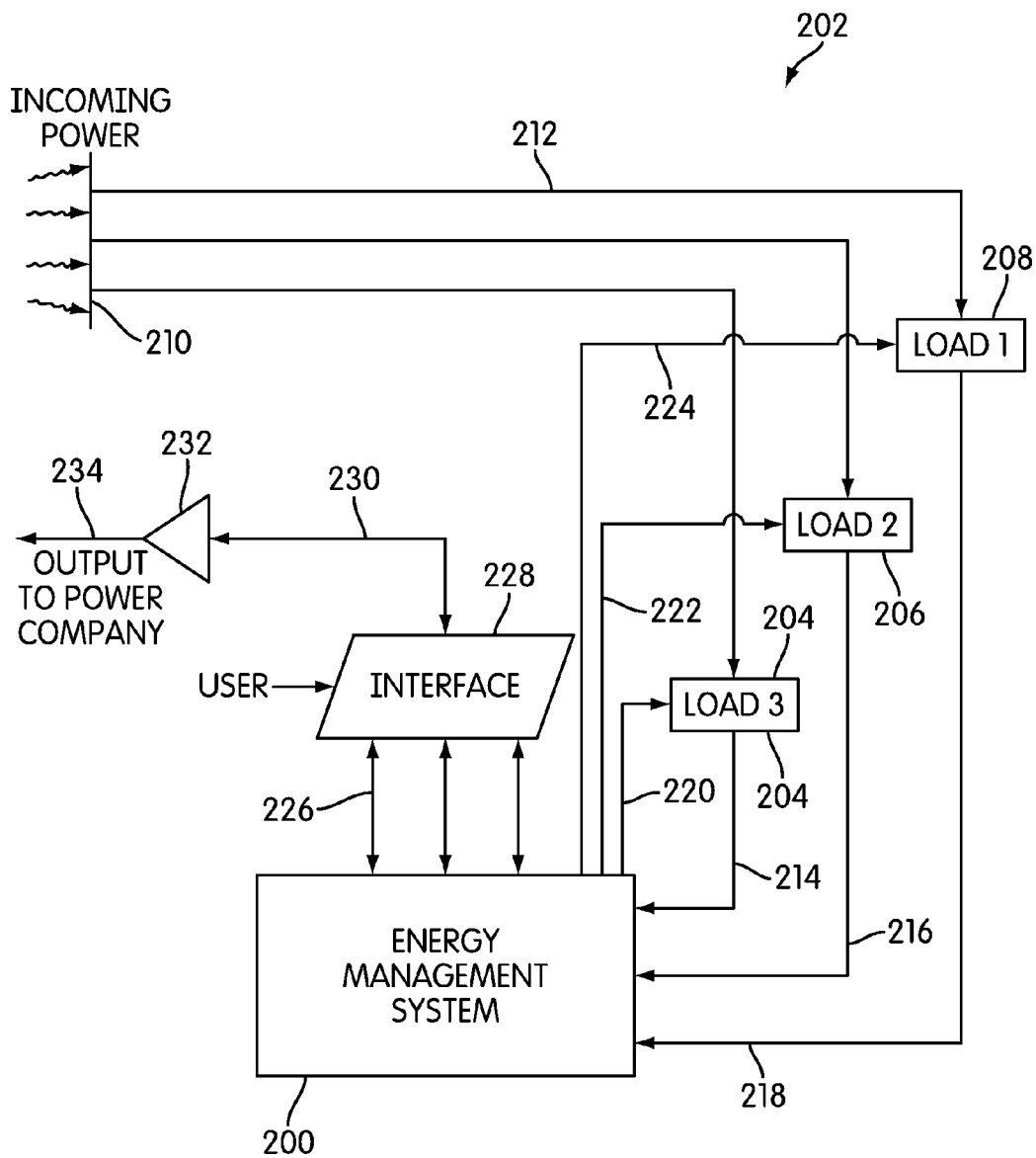
FIG. 3 is a block diagram showing an example embodiment of an energy management system in accordance with the invention.

The principles of the invention are disclosed, by way of example, in energy management system 200 adapted for managing certain properties of power application and consumption within an overall facility 202 having various load zones 204, 206, and 208, as shown in FIG. 3. The energy management system 200 in accordance with the invention is described herein and illustrated in FIGS. 3-8. For purposes of background, this application first discusses a switch/light correlation system which is adapted for use with a lighting system 102 as illustrated in FIG. 1. This is for purposes of background art. This example correlation system is described in U.S. Pat. No. 7,277,930 issued Oct. 2, 2007.

More specifically, the lighting system 102 is associated with one or more wands 104, with an example embodiment of one of the wands 104 being illustrated in FIG. 1. The wand 104 is utilized with the lighting system 102 so as to initially configure or reconfigure relationships or correlations among switches and lights of the lighting system 102. That is, the wand 104 provides a manual, handheld means for determining which of the lights of the lighting system 102 are controlled by which of the switches of the lighting system 102. Control of the lighting system 102 in accordance with the invention is provided through the use of relatively inexpensive apparatus, which is readily usable by the layperson.

Turning specifically to FIG. 1, the lighting system 102 includes a plurality of lighting units 106. In the particular embodiment illustrated in FIG. 1, there are n individual lighting units 106. Each lighting unit 106 includes a conventional light 107. The light 107 may be any one of a number of conventional lights, including florescent and LED devices. In view of the capability of the use of various types of lighting devices, the entirety of the correlation system may be one in which AC and/or DC devices are employed. Further, the lighting devices and other components associated with the correlation system in accordance with the invention may employ high voltage and low voltage functionality. The light 107 is electrically interconnected to and controlled by a controller 108, with each of the controllers 108 associated with one of the lighting units 106. Each of the controllers 108 may be a conventional programmable controller. Each programmable controller 108 will have a unique address 110 identifiable through the communications network of the lighting system 102.

Each of the lighting units 106 further includes an infrared (IR) sensor 112. The IR sensor 112 is conventional in nature and may be any one of numerous commercially available IR sensor devices. An IR sensor 112 is associated with each of the lighting units 106, and is utilized to receive IR signals from the wand 104 as described in subsequent paragraphs herein. Each of the IR sensors 112 is adapted to convert IR signals from the wand 104 to electrical signals, and apply the same to the corresponding controller 108 through line 114.

Referring again to each of the controllers 108, each controller has bi-directional communication with a control bus 116 or similar common interface used to provide for control and communication among various devices, such as the lighting units 106 and the switch units to be described in subsequent paragraphs herein. The control bus 116 or a similar communications interface is associated with a communications network 118. Communications network 118 may be sophisticated in design and provide for network control of a number of different devices associated with environmental systems, in addition to switch and lighting apparatus. For example, communications network 118 may be associated with network control of sound management, electrical supply (both AC and DC), HVAC and other environmental control systems. Alternatively, communications network 118 may be relatively simplistic in design and provide only a few functions associated solely with switches and lights. Each controller 108 associated with a lighting unit 106 communicates with the control bus 116 through a line 120. Each controller 108 may have the capability of not only storage of a unique address 110 associated with the corresponding light 107, but may also store other information, such as light state and the like.

In addition to the lighting unit 106, the lighting system 102 may also include a plurality of switch units 128. Each of the switch units 128 is utilized to control one or more of the lighting units 106. In the particular embodiment illustrated in FIG. 1, the lighting system 102 includes a series of m switch units 128. Referring to the specific switch unit 128 illustrated partially in schematic format in FIG. 1, the switch unit 128 includes a conventional switch 129. A switch 129 is associated with each one of the switch units 128. Each switch 129 can be any one of a number of conventional and commercially available switches.

Each of the switches 129 converts manual activation or deactivation into an output state applied on line 130. The state of switch 129 on line 130 is applied as an input to a conventional controller 132. Controller 132 is preferably a conventional programmable controller of any of a series of commercially available types. Each of the controllers 132 may correspond in structure to the controllers 108 associated with the lighting units 106. As with each of the controllers 108 of the lighting units 106, the controllers 132 each have a unique address 134 associated therewith. Each controller 132 may also include various programmable instructions and memory storage which may comprise a light control list 136 stored in writeable memory.

Each of the switch units 128 also includes an IR sensor 138. Each of the IR sensors 138 may correspond in structure and function to the IR sensors 112 associated with each of the lighting units 106. That is, each of the IR sensors 138 is adapted to receive IR signals as inputs signals, and convert the same to corresponding electrical signals. The electrical signals are applied as input signals on line 140 to the corresponding controller 132. As will be described in subsequent paragraphs herein, the input IR signals to the IR sensor 138 will be received from the wand 104, and will be utilized to compile and modify the light control list 136.

As with each of the controllers 108 associated with the lighting units 106, the controllers 132 associated with the switch units 128 will have bi-directional communication through line 140 with the control bus 116 of the communications network 118. Each of the switch units 128 may be configured (in accordance with methods described in subsequent paragraphs herein) so as to control one or more of the lights 107 of the lighting units 106. The general programmable control as specifically associated with the switch units 128 and the lighting units 106 is relatively straightforward, in that each of the controllers 132 may include, as part of the light control list 136, identifications of each of the unique addresses 110 of the lighting units 106 associated with the lights 107 to be controlled.

Figure 2:
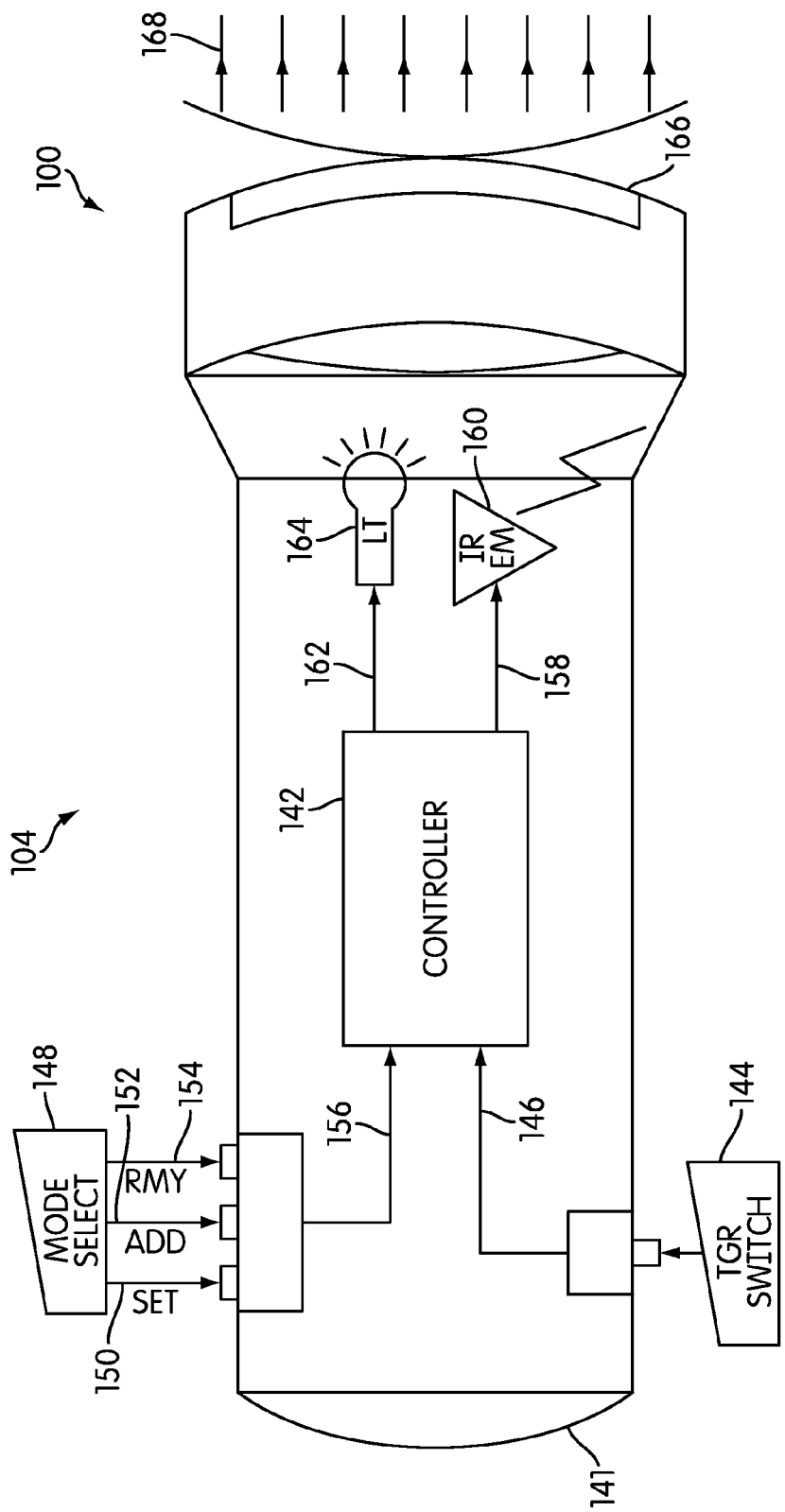
FIG. 2 is a block diagram partially in schematic format, illustrating a wand structured in accordance with the invention.

For purposes of controlling correlation or configuration among the lighting units 106 and the switch units 128, the embodiment illustrated in the drawings and in accordance with the invention includes a wand 104 as shown in block diagram format in FIG. 2. The wand 104 may include any type of desired mechanical structure, preferably including a housing 141. Enclosed within or otherwise interconnected to the housing 141 is a conventional programmable controller 142. The programmable controller 142 may be any of a number of conventional and commercially available controllers, preferably sized and configured for convenience of use within a device such as the handheld wand 104. The wand 104 also preferably includes a trigger switch 144. The trigger switch 144 may be manually operated by the user so as to generate a state signal as an input on line 146 to the controller 142. The state signal on line 146 may be a responsive signal to activation of the trigger switch 144 so as to cause the controller 142 to perform particular functions desired by the user.

The wand 104 also includes a mode selector module 148. The mode selector module 148 may preferably comprise a selector switching module adapted for three separate and independent inputs from the user. More specifically, the mode selector module 148 may include a SET switch 150, ADD switch 152 and REMOVE switch 154. The mode selector module 148 is adapted so as to generate and apply a state signal on line 156 as an input signal to the controller 142. The state signal on line 156 will preferably be of a unique state, dependent upon selective activation by the user of any one of the switches 150, 152 or 154. As with other specific elements of the wand 104, the mode selector module 148 may be one of any number of commercially available three switch modules, providing unique state outputs.

In response to state signals from the mode selector module 148 on line 156, and the trigger switch 144 on line 146, the controller 142 is adapted to apply activation signals on line 158, as input activation signals to an IR emitter 160. The IR emitter 160 is conventional in design and structure and adapted to transmit IR signals in response to activation signals from line 158.

In addition to controlling transmission of IR signals from the IR emitter 160, the controller 142 is also adapted to selectively generate and apply activation signals on line 162. The activation signals on line 162 are applied as signals to a visible light 164. As with the IR emitter 160, the visible light 164 may be any of a number of appropriate and commercially available lights for the purposes contemplated for use of the wand 104 in accordance with the invention.

In addition to the foregoing, the wand 104 may also preferably include a lens 166 spaced forward of the visible light 164. The lens 166 is preferably a lens which is transparent to both visible and infrared light. The lens 166 is also preferably a collimating lens for purposes of focusing the visible light 164 into a series of parallel light paths (e.g. a collimated light beam 168). The foregoing describes the general structure of one embodiment of a switch/light correlation system in accordance with the invention. The correlation system may be characterized as correlation system 100, which comprises the lighting system 102 and the wand 104. The operation of the correlation system 100 will now be described with reference to FIGS. 1 and 2.

As earlier stated, a principal concept of the invention is to provide a means for configuring (or reconfiguring) the communications network, so that certain of the switch units 128 control certain of the lighting units 106. For these purposes, a plurality of wands 104 may be utilized. For example, the wands 104 may be numbered W-1, W-2, W-3 . . . W-a, where a is the total number of wands 104. An individual wand 104 may be characterized as wand W-A, where A is the particular wand number 1 through a.

As earlier described, each of the wands 104 may be utilized to initiate one of three commands, namely SET, ADD or REMOVE, through use of the mode selector module 148, and its switches 150, 152 and 154. More specifically, and as an example, the user may wish to initiate a SET command for purposes of associating one or more of the switches 129 with one or more of the lights 107. The user may first activate the SET switch 150. At the time the SET command is to be transmitted to an appropriate one of the lights 107 or switches 129, the trigger switch 144 is activated by the user. The controller 142 of the wand 104, in response to the SET command signal and the trigger switch signal, will generate appropriate electrical signals to the IR emitter 160. The IR emitter 160, in turn, will transmit IR signals representative of the SET command. These IR signals will be received as input signals by the respective IR sensor 112 or 138 associated with the lighting unit 106 or switch 128, respectively, to which the wand 104 is then currently pointed.

For purposes of describing available configuration sequences for control of the lighting units 106 through the switch units 128, it is advantageous to number the lights 107 and switches 129. As earlier stated, the embodiment illustrated in FIGS. 1 and 2 utilize n lights 107 and m switches 129. An individual light 107 may be characterized as light L-X, where X is an integer from 1 to n. Correspondingly, an individual switch 129 may be characterized as switch S-Y, where Y is an integer from 1 to m.

For operation in accordance with the invention, the lighting system 100 will also maintain memory of each particular command and command number for each of the wands 104. For purposes of description, each command may be referenced as C-N, where N is the sequential number of the command generated by a specific wand 104. For example, a command referenced herein as W-4, C-3 would reference the third command from the fourth wand 104. To fully identify a particular command, it may be designated as W-4, C-3, SET, meaning that IR signals are generated from the fourth wand 104, indicating that, in fact, the signals are from the fourth wand, they represent the third command from the fourth wand, and they are indicative of a SET command.

If the wand 104 is being "pointed" to, for example, light L-2 when the trigger switch 144 is activated, the complete "directional" command may be characterized as W-4, C-3, SET, L-2. Correspondingly, if the wand is pointed at S-4, for example, the directional command may be characterized as W-4, C-3, SET, S-4. To designate ADD and REMOVE commands, the "SET" designation would be replaced by the designation "ADD" or "REMOVE," respectively.

A specific sequential process will now be described as an embodiment in accordance with the invention to relate or correlate control between a particular one of the switches 129 and the lights 107. Assume that the user wishes to configure the lighting system 100 such that switch S-6 is to control light L-4. Further assume that the sixth wand 104 is being utilized by the user, and the last command transmitted by wand W-6 was the fourteenth command (e.g. C-14). Let it be further assumed that command C-14 from wand W-6 was transmitted to one of the switches 129. The user would first configure the mode selector module 148 for wand W-6 so as to enable the SET switch 150. The wand W-6 is than pointed to the lighting unit 106 associated with light L-4. The directional configuration of the wand 104 is indicated by the collimated light beam 168. With this configuration, the user may activate the trigger switch 144 of wand W-6. To indicate transmittal of the command, the light 164 may preferably be "blinked" so as to indicate appropriate command transmittal. The command may be characterized as W-6, C-15, SET, L-4. The command is transmitted to light L-4 through transmittal of IR signals from the IR emitter 160 associated with wand W-6. These IR signals will be received by the IR sensor 112 associated with the lighting unit 106 for light L-4. IR signals received by the IR sensor 112 are converted to corresponding electrical signals applied to the corresponding controller 108 through line 114. These signals are then also available to the communications network 118.

Following transmittal of the SET command to light L-4, the user then "points" the wand W-6 to switch S-6 of the set of switches 129. When the wand W-6 has an appropriate directional configuration as indicated by the collimated light beam 168, the trigger switch 144 can again be activated, thereby transmitting IR signals through the IR emitter 160 to switch S-6, indicative of a SET command. This directional command can be characterized as W-6, C-16, SET, S-6. The IR signals transmitted by the IR emitter 160 will be received by the IR sensor 138 associated with the switch unit 128 for switch S-6 of the set of switches 129. IR signals received by the IR sensor 138 from wand W-6 are converted to electrical signals on line 140 and applied as input signals to the corresponding controller 132. Signals indicative of the command are also made available to the communications network 118.

When this particular command is received by switch unit 128 for switch S-6, program control via controllers 108, 132, and communications network 118 will have knowledge that the SET command sent to switch S-6 was the sixteenth command from wand W-6. Programmable processes are then undertaken to determine the particular command corresponding to the fifteenth command from wand W-6, i.e. W-6, C-15. Through the prior storage of data associated with the command W-6, C-15, a determination is made that this particular command was a SET command transmitted to light L-4. With this information, the communications network 118 is provided with sufficient data so as to configure the lighting system 100 such that switch S-6 is made to control light L-4. Following this determination with respect to command C-15 for wand W-6, a search is made for the fourteenth command (e.g. C-14) transmitted from W-6. If it is determined that command C-14 from wand W-6 was a command transmitted to one of the switches 129, and not to any one of the lights 107, this particular sequence for configuration of the lighting system is then complete. Upon completion, activation of switch S-6 is made to control light L-4.

The foregoing sequence is an example of where a single one of the switches 129 is made to control a single one of the lights 107. In accordance with the invention, the lighting system 100 may also be configured so as to have one of these switches 129 control two or more of the lights 107. To illustrate a configuration sequence for control of three of the lights 107 by a single one of the switches 129, an example similar to the foregoing example using commands from wand W-6 may be utilized. More specifically, it can be assumed that command C-12 from wand W-6 was a command directed to one of the switches 129. It can be further assumed that the user wishes to have switch S-6 control not only light L-4, but also lights L-7 and L-10. Using wand W-6, the user may than transmit a SET command to light L-10 as the thirteenth command from wand W-6. That is, the command will be described as W-6, C-13, SET, L-10. Directional pointing of the wand W-6 toward light L-10 would be in accordance with the prior description herein. After command C-13 is transmitted, a further SET command can be transmitted to L-7. This will be the fourteenth command from wand W-6, and would be indicated as W-6, C-14, SET, L-7. Following this command, the two SET commands C-15 and C-16 for light L-4 and switch S-6, respectively, can be transmitted as described in the prior example. Following the receipt of command C-16 by the switch unit 128 associated with switch S-6, the communications network 118 and the associated controllers 108, 132 would than be made to search for data indicative of command C-15 from wand W-6. Upon a determination that command C-15 was a SET command to light L-4, switch S-6 would be made to control light L-4.

A further search would then be made for command C-14 from wand W-6. Unlike the prior example, the lighting system 100 would make a determination that this particular command was a SET command to light L-7, rather than a command to a switch 129. With command C-14 being transmitted to light L-7, the communications network 118 would be configured so that switch S-6 would be made to control not only light L-4, but also light L-7. Thereafter, the lighting system 100 would be made to search for data indicative of command C-13 from wand W-6. Upon a determination that command C-13 was a SET command to light L-10, the switch S-6 would be further configured through the communications network 118 so as to control not only lights L-4 and L-7, but also light L-10. A search for data indicative of command C-12 from wand W-6 would then be undertaken by the communications network 118. Upon determining that this particular command was a command directed to one of the switches 129, the communications network 118 would determine that this particular sequential configuration is completed. Upon completion, the controller 132 of the switch unit 128 associated with switch S-6 will include a light control list 136 having data indicative of switch S-6 controlling lights L-4, L-7, and L-10. Program control through the appropriate controllers and the communications network 118 will then effect this configuration, so that switch S-6 will have control of all three of the designated lights.

The foregoing examples of sequential configuration in accordance with the invention have illustrated the setting of control of a single light 107 by a single switch 129, and the setting of control of three of the lights 107 by a single switch 129. In addition to these functions, the lighting system 100 in accordance with the invention can also operate so as to configure a "master/slave" relationship among two or more of the switches 129. As an example, it can be assumed that wand W-6 was utilized to transmit a series of commands C-12, C-13, C-14, C-15, and C-16 as described in the foregoing paragraphs. It may also be assumed that the commands were exactly as described in the foregoing paragraphs in that the commands C-13 through C-16 were made to cause switch S-6 to control lights L-10, L-7, and L-4. A seventeenth command may then be generated through the use of wand W-6, with the command being a SET command and the wand W-6 being pointed at switch S-8. This command would be designated as W-6, C-17, SET, S-8. This command will be transmitted in accordance with the procedures previously described herein with respect to other SET commands. Upon receipt of IR signals by the IR sensor 138 associated with the switch unit 128 for switch S-8, the controllers and communications network 118 would then be made to search for data indicative of command C-16 from wand W-6. The data indicative of command C-16 from wand W-6 would indicate that this particular command was a SET command to switch S-6. Accordingly, the command C-16, which was immediately prior to command C-17 from wand W-6, was a command directed to a switch, rather than a light. Upon a determination that this immediately prior command C-16 was directed to switch S-6, and a determination that command C-15 was directed to a light L-4, program control through the communications network 118 would configure the lighting system 100 so that switch S-8 will be configured by the communications network 118 as a "master" switch for control of lights L-10, L-7, and L-4, while switch S-6 is "slaved" to switch S-8.

The foregoing commands from one of the wands 104 have been described with respect to SET commands. As earlier described, the mode selector module 148 also includes an ADD switch 152 and a REMOVE switch 154. Functionality of the lighting system 100 for purposes of these particular functions is similar to the functionality for the SET commands. Accordingly, relatively simple configuration sequences will be described in the subsequent paragraphs with respect to examples of use of the ADD and REMOVE commands. Continuing with the example of use of wand W-6, and assuming that a SET command would be the eighteenth command C-18, the mode selector module 148 may be set by the user so as to enable the ADD switch 152. Assume that the user wishes to add light L-20 to the control list for switch S-10. The user would than point the wand W-6 to light L-20, and activate the trigger switch 144 so as to transmit command W-6, C-18, ADD, L-20. Following transmittal of this command, the user may than transmit a further ADD command by pointing the wand W-6 to switch S-10. The command transmitted would be characterized as W-6, C-19, ADD, S-10. Upon receipt of the ADD command for switch S-10, the controllers 108, 132 and the communications network 118 would than search for data indicative of command C-18 from W-6. Data would be found indicative of command C-18 being an ADD command transmitted to light L-20. Accordingly, the communications network 118 would be configured so as to ADD light L-20 to the list of lights 107 which are under control of switch S-10. A further search would than be made for data indicative of command C-17 from wand W-6. Upon obtaining data indicative of the fact that command C-17 was a SET command to switch S-6, the configuration sequence would than be considered complete. That is, light L-20 would be controlled by switch S-10. Use of the ADD command, instead of the SET command, will cause light L-20 to be added to the lights 107 then currently being controlled by switch S-10.

In accordance with the foregoing description, it is apparent that if command C-17 had been an ADD command associated with a particular light, then not only light L-20, but also the light associated with command C-17 would also be added to the list of lights 107 controlled by switch S-10.

In addition to the SET and ADD commands, the user may also employ a REMOVE command. The REMOVE mode may be selected by enabling the REMOVE switch 154 of the mode selector module 148 associated with the particular wand 104 to be used. Functionality of the REMOVE command is similar to the functionality associated with use of the SET and ADD commands. To illustrate use of the REMOVE command, it can be assumed that the user wishes to REMOVE control of light L-30 by switch S-25. Using wand W-6, the user may enable the REMOVE switch 154, point the wand W-6 to light L-30, and activate the trigger switch 144. This causes transmittal of the command W-6, C-20, REMOVE, L-30. Upon completion, the user may then point wand W-6 to switch S-25, and again transmit a REMOVE command. This command may be characterized as command W-6, C-21, REMOVE, S-25. Upon receipt of the signals indicative of command C-21, the switch unit 128 associated with switch S-25 would than cause the communications network 118 to search for data indicative of command C-20 from wand W-6. Upon retrieval of data indicating that command C-20 from wand W-6 was a REMOVE command transmitted to light L-30, the communications network 118 would be reconfigured so as to REMOVE light L-30 from control by switch S-25. A further search would than be made for data indicative of command C-19 from wand W-6. Upon obtaining data indicating that command C-19 was a command directed to switch S-10, the REMOVE process would be considered complete. Through this reconfiguration, light L-30 would no longer be controlled by switch S-25. It will be apparent from the description of the foregoing configuration processes that control of two or more of the lights 107 may be REMOVED from a particular one of the switches 129, through processes similar to the foregoing.

The foregoing describes particular embodiments of a lighting system 100 in accordance with the invention. It will be apparent that other embodiments in accordance with the invention may be utilized, without departing from the principal concepts of the invention. For example, it would also be possible to have an IR emitter associated with each of the lighting units 106, and an IR emitter associated with each of the switch units 128. Correspondingly, an IR sensor could then be employed within each of the wands 104. With this type of configuration, each of the wands 104 may be utilized to receive and to transmit IR signals. Correspondingly, each of the switch units 128 and lighting units 106 can also be enabled to transmit IR signals. As an example of commands which can be utilized with this type of configuration, a command could be generated from a wand 104 or a switch unit 128 requesting certain of the lights 107 to "broadcast" their individual addresses. For purposes of undertaking such activities by a switch unit 128, various commands other than merely SET, REMOVE and ADD commands could be transmitted from each of the wands 104. With the foregoing types of configurations, switch units 128 may be made to directly transmit commands to lighting units 106 through spatial signals.

Still further, sensors could be included within switch units 128 and the wands 104 so as to sense visible light itself. With this type of configuration, commands may be transmitted to the lighting units 106 so as to cause the lights 107 themselves to "blink" their own codes, such as their unique addresses. It is apparent that other variations of spatial signal transmission/reception may be utilized in accordance with the invention, without departing from the novel concepts thereof.

In addition to the foregoing, it is also possible in accordance with the invention to include additional features regarding "feedback" to each of the wands 104. That is, it may be worthwhile to include means for indicating successful reception and execution of a command. In this regard, for example, and as earlier described herein, the visible light 164 for each of the wands 104 may be made to "blink" when the trigger switch 144 is activated, indicating the transmission of a command. Other functionality may be included to provide feedback, such as each of the lights 107 which is the subject of a command from one of the wands 104 being made to "blink" or otherwise indicate successful reception or completion of a command. Still further, and as somewhat earlier described herein, it would also be feasible in accordance with the invention to cause a switch unit 128 and the communications network 118 to cause all of the lights 107 which are the subject of a series of commands to "blink" so as to further indicate successful reception and/or completion of a command sequence.

Turning now to the energy management system 200 in accordance with the invention, and with reference to FIG. 3, the drawing illustrates a facility 202 having an incoming power grid 210. Power is applied from the incoming power grid 210 on lines 212 to separate load zones. In this case, the load zones are defined as: load zone LOAD 1 and 208; load zone LOAD 2 and 206; and load zone LOAD 3 and 204. Information regarding the various types of devices within the load zones (such as dimmers, switches, lights, computers, and the like) is transmitted on lines 214, 216, and 218 to the energy management system 200. Within the energy management system 200, various data regarding the specific power consumptions, individual devices, average loads, and other factual information can be measured and calculated. The devices within the load zones can be controlled (in terms of power consumption) through signals transmitted on lines 220, 222, and 224. Also, if desired, signals can be transmitted on a wireless basis or through a network such as the network previously described herein with respect to the light units 106 and the switch units 128.

Further, information regarding power consumption and other data can be received from the energy management system 200 and applied on lines 226 to an interface 228. The interface 228 can be a graphical user interface or the like through which interactive processes can be performed with the user. Further, the interface 228 can be used as a means for transmitting, on line 230 and external communications unit 232, output data to the power company on line 234. Still further, the lines 226 between the interface 228 and the energy management system 200 can be utilized to transmit information from the user and from the power company from the interface 228 to the energy management system 200. In this manner, power consumption, load targeting, load shedding and other such functions can be performed with the energy management system 200.

With respect to use, and with reference first to FIG. 4, the energy management system 200 can include, as previously described, a load shedding feature. The purpose of the feature is to enable an energy company or a facility management group to conserve energy usage over a period of time, without interfering with comfort and function of the space being used.

FIG. 4 shows a screen shot related to the load shedding feature and capable of being used so as to ensure that all energy consuming devices within the facility 202 have been discovered, labeled and placed under proper zone. In this regard, a control management feature can include a "settings/tools" section to appropriately identify and label the devices. As shown in FIG. 4, there is a section titled "zone properties" which shows the current path being viewed by the user, and the number of devices in the zone. Also shown are kilowatt/hours currently being consumed at this particular zone and its sub-zones, and the average load level.

The second section in FIG. 4 labeled "zone contents," contains the table of the devices within the facility 202. The user can either click on a device to edit its energy properties or, alternatively, use check boxes next to the devices and zones (along with the buttons at the bottom of the page) to control the output level of these devices/zones.

Maximum load indicators in this table show the maximum load level to which the device is to be restricted. This value is controlled by the energy load shedding goal engine. The value can be edited, but the goal engine may possibly over right yet, depending upon particular selected options. "User status" shows the load level that the user will see. The "act status column" is the actual load level being output by the device. The "Kwh column" shows the current power the device is consuming.

FIG. 5 illustrates a screen shot showing functions that can be associated with particular devices, in this example, FIG. 5 relates to a dimmer. The second section of the screen shot relates to energy properties. The section entitled "full power watts drawn" can be used to calculate how much energy the device is consuming. The "load shedding group" identifies the group number used by the goal engine to determine in which order the device's load level should be modified by the load shedding goal engine. The "load shedding gain" is used to determine the size of the load level change implemented by the load shedding goal engine. The "dim load by" section allows the user to choose what criteria would be used by the load shedding goal engine for dimming the device. The "max load shedding" is set to determine the devices maximum load level. The "min load setting" section allows the user to set the device's lowest load level during a load shedding event.

Figures 6, 7, 8:
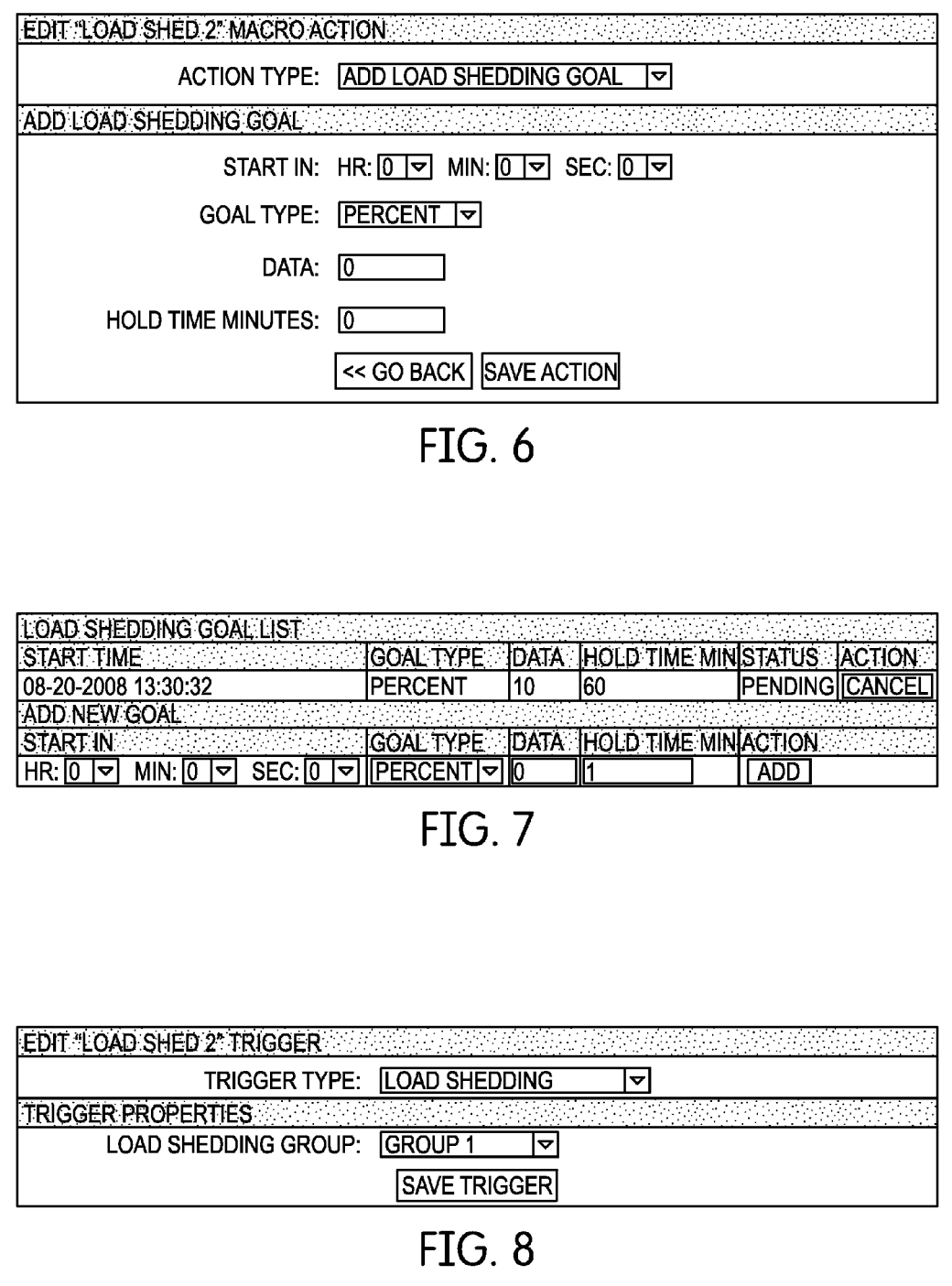

FIG. 6 illustrates a screen shot for adding a particular load shedding goal. FIG. 7 illustrates a screen shot showing that the user has the capability of viewing an entire list of the load shedding goals. FIG. 8 is a screen shot illustrating that the user has the capability of setting and editing the trigger properties for load shedding activities.

It should be noted that in accordance with various aspects of the invention, activities are capable of being undertaken which are broader than merely lowering the wattage which may be utilized by the entirety of a facility 202 when consumption exceeds certain targets. Instead, the invention contemplates the execution of various events that may have significant energy savings strategies. For example, in large office buildings, and when it is desired to lower power consumption, the invention may include the process of dimming all ambient light to a minimum or disenabling ambient light in total. Correspondingly, the energy management system 200 may monitor individual workstations, so as to determine those workstations that are currently occupied. Such activities can be undertaken by periodically polling the workstation occupancies through interconnection with occupancy sensors. The management system 200 can then enable or otherwise activate task lights only within those workstations which are then currently occupied. By periodically polling the occupancy sensors, it can be determined which workstations subsequently become occupied or emptied.

It should also be emphasized that the energy management system 200 may be considered to be an energy management tool capable of being used by various entities. Such an entity management tool may be utilized, for example, by an owner of a building, although the owner is completely remote from the building. In addition, the management tool may be utilized by the power companies themselves.

It should also be noted that the load shedding or load balancing functions may involve setting a specific target for consumption, and then periodically measuring for the same. As earlier stated, various activities can be undertaken so as to lower energy consumption in the event that power consumption exceeds the target, either based on the entirety of a facility, individual zones or the like. It should also be emphasized that rather than use a specific target, the energy management system 200 could also utilize "windows" or tolerance bands. That is, rather than any specific target, the management system will operate so as to attempt to maintain power consumption within a particular range.

In addition to the foregoing, it is also contemplated that the energy management system could be remote from the facility 202, and could also be utilized to manage various other facilities. In this regard, communication could occur through the interne from the individual separate facilities to a common server. The server would essentially act as the energy management system 200 for each of the facilities 202.

Another description of energy management systems in accordance with the invention can include the concept of a global "controller" which would be responsible for calculating energy consumption data. The data would be passed on to a web server. The controller would then send the calculated energy information consumed for each device, along with a hierarchy information and any naming or grouping parameters, to the web server for storage.

The foregoing activities could involve, for example, the following functions in accordance with the invention:
1. The gateway controller would need to register with the server, so as to keep data separate.
2. The controller would transmit information regarding the hierarchy structure to the server. If the user would remove a load zone from the hierarchy, then the data in the server could be disabled.
3. The gateway can also send all of the nodes that are reporting load level changes on a line by line basis. This information can be put into a device table in the database for later usage by the reporting tool.
4. The controller can then transmit all of the device energy usage information, on a periodic basis. The server would maintain an energy table that receives updates with the data. The server uses an engine which would continuously execute by using a "current energy table" so as to generate a log of energy.
5. For usage, a user would need to register for the service. The user would connect its web browser to the server, for purposes of syncing up. Once linked, the user can login to the server, and view information. Information can be shown in various methods, including tables, bar graphs and the like.
6. Locations can be identified by the user, with the user being able to receive information such as total energy, energy by zone, energy by device type and the like. In addition, a "comparison" option can be provided, which allows the user to select a guideline for purposes of "rationalizing" the data: day; week; month; priority group; and the like.
7. A home page or "dash board" can provide the user with the ability to "run a report."

Figure 9:
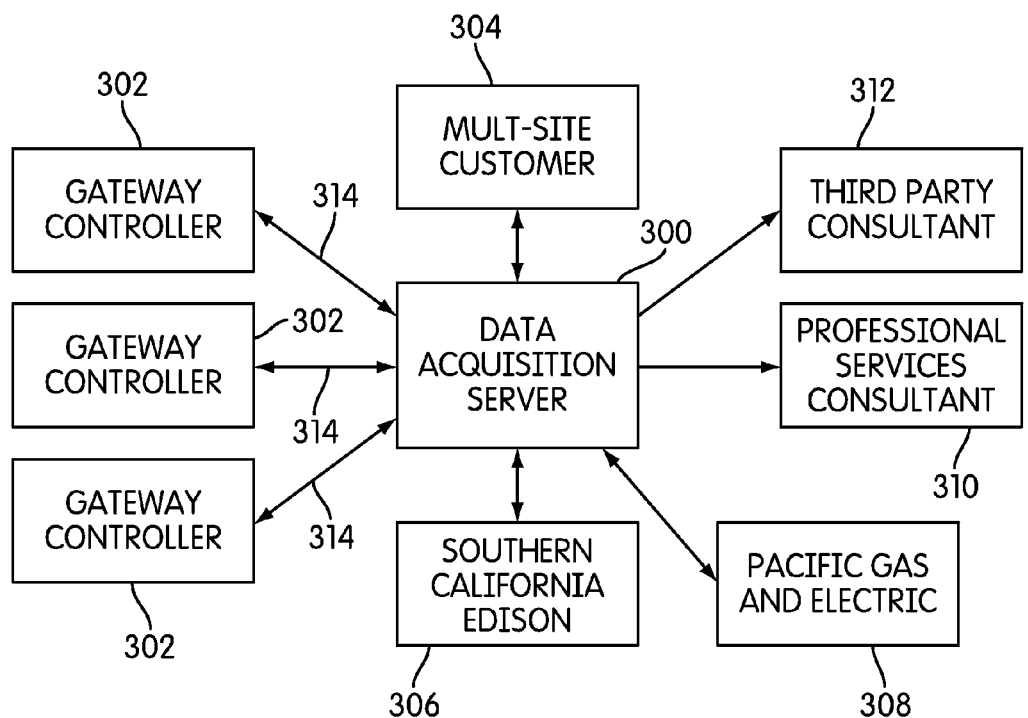
FIG. 9 is a block diagram showing an embodiment of the invention as implemented through the use of a data acquisition server system.

An energy management system in accordance with the invention can also be characterized with the use of a data acquisition server as shown in FIG. 9. With reference thereto, the system includes a series of gateway controllers 302 which can log data elements (including energy consumption data) from various facilities, such as the facilities 202 previously referenced herein. The controllers 302 have bidirectional communication on lines 314 with the data acquisition server 300. The data acquisition server 300 is used to aggregate data from the multiple and remote gateway system installations, for purposes of post processing and report of analytics. The data acquisition server 300 can also be utilized as a portal for managing multi-site installations, such as the multi-customer 304 shown in FIG. 9. The server 300 can also be utilized to broker energy reduction "demand response" exchanges from region utility companies, such as Southern California Edison 306 and Pacific Gas & Electric 308 also shown in FIG. 9. An implementation of the data acquisition server 300 in accordance with the invention would be capable, in its entirety, of controlling and interoperating with functions such as the following: lighting systems; plug loads; HVAC systems; audiovisual systems; and access control systems.

Correspondingly, the server 300 can also be utilized for purposes of receiving data related to the following: energy usage-lighting systems; energy usage-plug loads; energy usage-HVAC; alternative energy source and usage; subsystem usage; occupancy; system warranty activation; system configurations; site locations specific data (room square footage); and RTLS data.

Also in accordance with certain concepts of the invention, the data acquisition server 300 and the associated system may be utilized for what could be characterized as a "smart building viewer and report generator." This particular application would request data acquisition server associated devices, and the user is able to view the energy usage, occupancy and other analytics for the system. In addition, the user would be capable of generating reports and implementing energy consumption and system usage changes.

Still further, third party consultants such as consultant 312 and professional services consultant 310 shown in FIG. 9 would be capable of remotely accessing the data acquisition software 300, for purposes of retrieving data.

Still further, the system may allow for the brokering of demand response commands between the remote systems and regional utility companies. These functions can include the following: denomination and selection of loads for curtailment and scheduling; automated curtailment notification; meter verifications; and settlement calculations. In addition, the system can also report and verify the activity utility, the customer's adherence to the demand response request.

Still further, with respect to multi-site management, the customer 304 can manage and control each of its facilities remotely through a web interface. This web interface also allows the company to review performance data of each site, and also create reports that compare the performance of individual sites to standard bench marks, as well as to each other.

Figure 10:
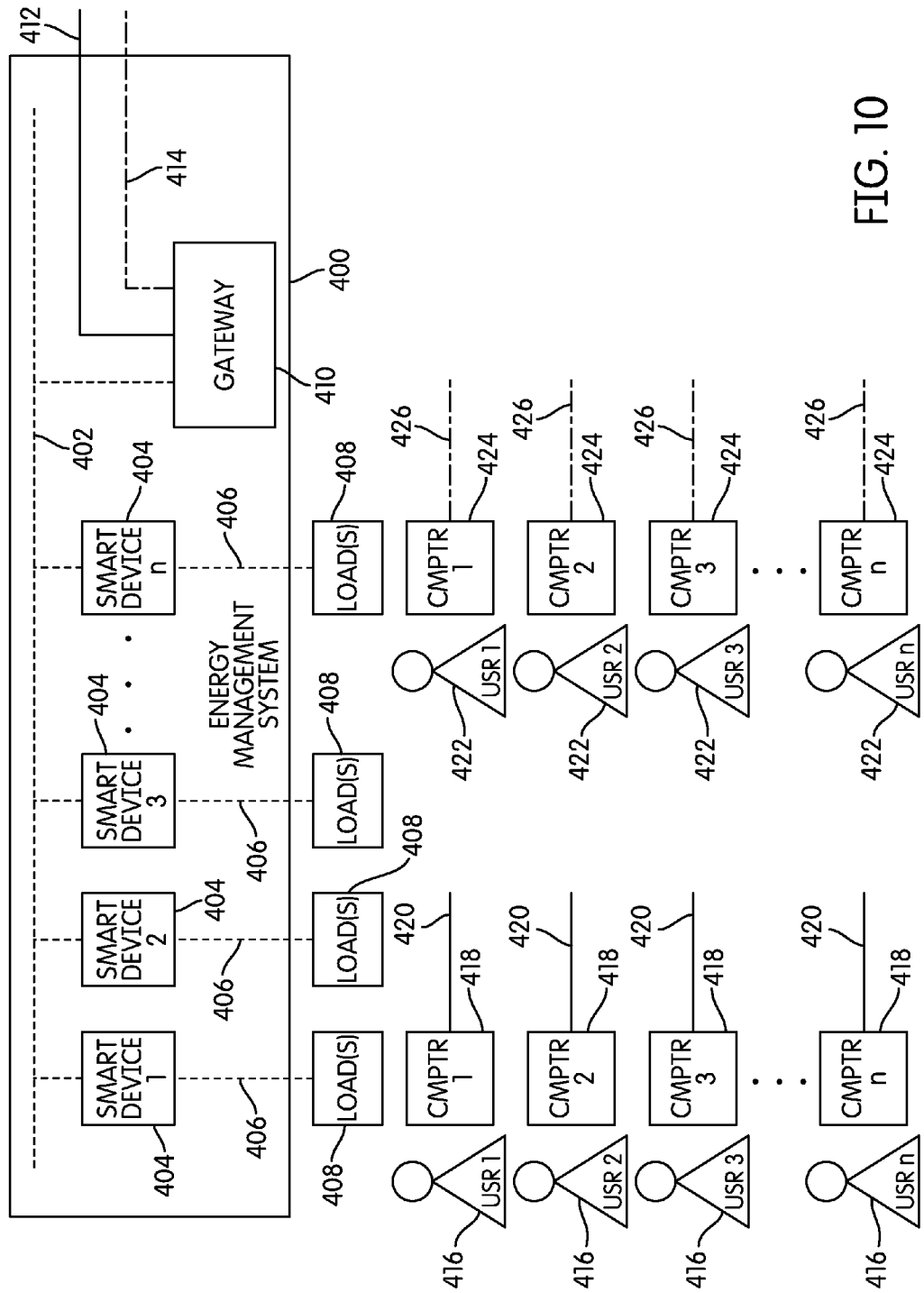
FIG. 10 is a block diagram showing various concepts of a singular energy management system in accordance with the invention, having a number of smart devices.

Additional concepts associated with energy management systems in accordance with the invention will now be described with respect to FIGS. 10-15. Turning to the drawings, FIG. 10 a block diagram illustrating an energy management system 400 in accordance with certain aspects of the invention, along with various other devices which are controlled by the energy management system 400. With reference to the system 400, the system 400 includes a network system communication bus 402. Shown symbolically in FIG. 10, the network system communication bus 402 can consist of three communication lines/buses. These buses can include a network bus, node bus and accessory bus. In an example embodiment, the network bus can consist of RJ11 patch cords which can carry protocol messages between hubs associated with the energy management system. The node bus can include RJ45 patch cords which carry protocol messages from the hubs to a series of smart devices 404, also shown in FIG. 10 as being part of the energy management system 400. The accessory bus can consist of RJ45 patch cords which carry the protocol messages from the smart devices 404 on the node bus to other smart devices 404. For a physically realizable system, the system must consist of at least one hub, two smart devices and the necessary patch cords for interconnecting the aforementioned components. The smart devices 404 can comprise a number of devices, as desired by the user. Smart devices have been disclosed in various other documents, including International Patent Application Publication No. WO2006/026648, published Mar. 9, 2006. The publication is entitled DESIGNATION BASED PROTOCOL SYSTEMS FOR RECONFIGURING CONTROL RELATIONSHIPS AMONG DEVICES. Components corresponding to the smart devices are disclosed in substantial detail in the aforementioned publication. As an example, each of the smart devices 404 can include a microprocessor, with a circuit board inside of the device. Upon power enablement, the microprocessor can load a program which can be stored in flash memory and initiate executing instructions. Each of the smart devices 404 can have one or more network bus ports connected to the circuit board. Also, certain of the smart devices can also have one or more accessory bus ports connected to a circuit board. In FIG. 10, each of the smart devices 404 is connected through lines 406 to a series of loads 408. The loads 408 can be various types of electrical loads. As an example, and with respect to a load which can be controlled, each of the loads can be in a form of a dimmable light. Each of the smart devices 404 can include the ability to turn loads 408 on and off. Also, in the case of dimming smart devices 404 connected to dimmable light fixtures as the loads 408, the ability can be provided to increase or decrease the brightness of the lights, thereby resulting in an increase or decrease of energy consumption.

As further shown in FIG. 10, a gateway 410 is provided. One or more gateways 410 may be included within a customer installation. Each gateway 410 can be in the form of a smart device 404 which actually constitutes a web server. The gateway 410 can include a node bus port, along with two TCP/IP network ports. One of the ports can be utilized to service a local area network ("LAN"), while the other can be utilized to service a wide area network ("WAN"), such as an office intranet. The line 412 can be characterized as a LAN communications line and port, which is essentially hosted by the gateway 410. Correspondingly, the line 414 illustrated in FIG. 10 can be characterized as a communications line and port for the WAN network, again hosted by the gateway 410. The gateway 410 can include software for executing an application which will provide a user with the ability to interact with the network system. More specifically, the user can access the software application through the use of a web browser on a computer which can be connected to either the WAN network or the LAN network. This is illustrated by the components in FIG. 10 which indicate LAN users 416 and WAN users 422. The LAN users 416 can utilize computers 418 which are connected through LAN communication lines 420 to the gateway 410. Accordingly, the representative lines 420 can essentially correspond to the representative lines 412. Correspondingly, the WAN users are shown as WAN users 422, which utilize computers 424. Each of the computers 424 can be connected through WAN communication lines 426 to the gateway 410. Accordingly, the WAN communication lines 426 correspond to the WAN communication lines 414. The software application associated with the gateway 410 can include features such as organizing and naming the devices 404 on the system, as well as creating "custom" events which may be in the form of a series of network actions. These actions can include the control of energy to the loads 408 based on time, date, weather or other system messages which may be in the form of various other types of triggers.

Figure 11:
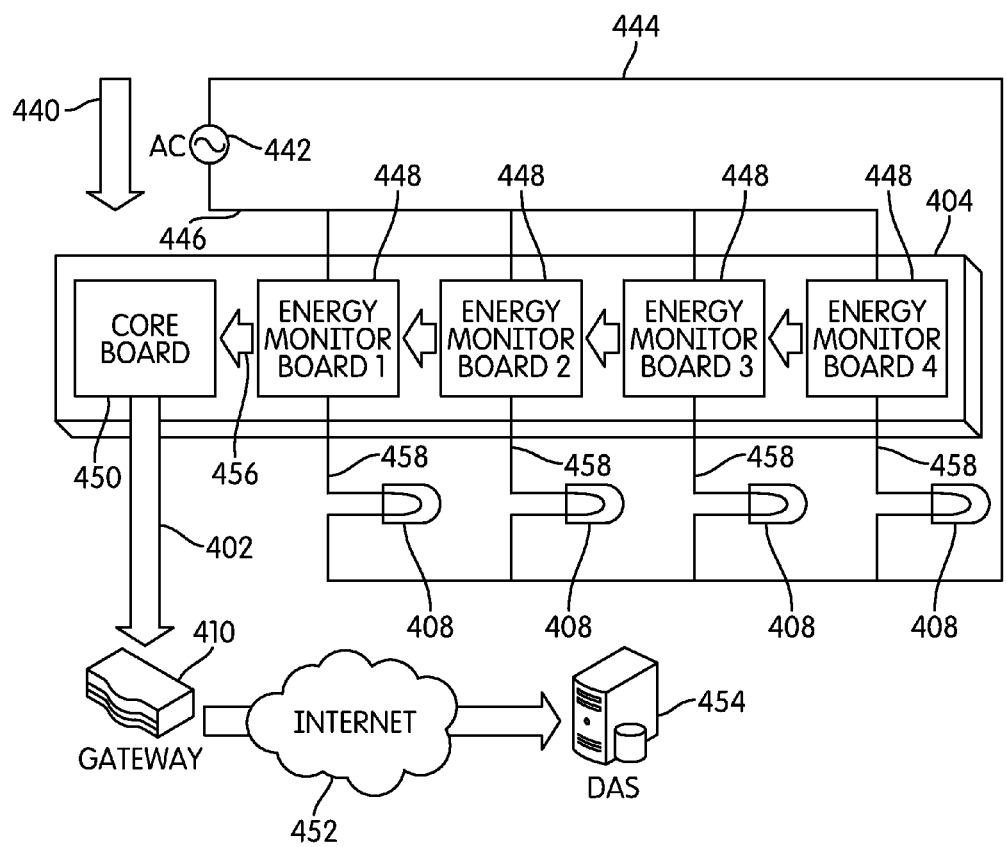
FIG. 11 shows details associated with a smart device having energy monitoring boards and a core board, along with connections to a gateway.

FIG. 11 illustrates other aspects of the energy management system 400 in accordance with the invention, and is particularly directed to concepts associated with energy monitor boards and the core boards, along with their functions and communication paths to other components of the energy management system 400. More specifically, FIG. 11 illustrates an energy data path 440 in representative form, with the path including an AC or other type of power source 442. The power source 442 provides power along power lines 444 to loads 408, previously described with respect to FIG. 10. FIG. 11 further illustrates a smart device 404, and shows specific components associated with the same. In the smart device 404 shown in FIG. 11, there are a series of four energy monitor boards 448. Power from the power source 442 is directed through the energy monitor boards 446 to the individual loads 408. Correspondingly, each of the energy monitor boards 448 includes a communications path 456 to a core board 450. The core board 450 is connected through the system communications bus 402 to the gateway 410. From the gateway 410, communication signals can be applied over an internet path 452 to a data acquisition server ("DAS") 454, which will be described in greater detail in subsequent paragraphs herein. The number of energy monitor boards 448 which may be associated with one smart device 404 is variable. Each of the energy monitor boards 448 can be characterized as a circuit board which includes a programmed microprocessor and a computer chip. Upon power enablement, the microprocessor can load its program from flash memory and initiate instructions. The program can cause the microprocessor to communicate with the computer chip. Among another data, the computer chip can measure, in real time, the active energy of the connected load 408. This is through the connections from the energy monitor boards 448 on paths 458 to the loads 408.

In an example embodiment, the core board 450 can be characterized as a master circuit board within the smart device 404. Each of the devices 404 will have at least one master circuit board 448 and one core board 450. The software associated with the core board 450 can collect data (for example, in the form of watt hours every minute) from the energy monitor boards 448. The core board 450 can then forward the data onto the network where the gateway 410 can receive, process and store the data. In the example embodiment, for each smart device 404 having a core board 450 and at least one energy monitor board 448, the gateway 410 can accumulate each of one-minute active energy readings for a period of 15 minutes. After the fifteenth reading, the gateway can transmit the accumulated active energy (for each device 404) to what could be characterized as an energy server. The energy server corresponds to the data acquisition server ("DAS") shown as data acquisition server 454 in FIG. 11. The energy server 454 can store the 15 minute readings from each device 404 connected to a particular gateway 410 within a database. As an example, the data could be stored for a period of time of up to five years, dependent upon the particular service the customer is receiving.

With respect to additional details of a specific embodiment, the gateway 410 can receive the energy data each minute and save the data for each device 404. The gateway 410 can store the summed data into a file Metrix data every 15 minutes for purposes of sending to the data acquisition server 454. The gateway 410 can transmit the Metrix data file to the data acquisition server 454 every 15 minutes, from the time that the gateway is enabled. In one embodiment, the gateway 410 can "open" a TCP/IP port over the interne (shown as path 452) and transmit the meta data file. If the file was successfully sent, the file on the gateway 410 can be deleted.

The Metrix file can be in a format which has a line for each energy reporting device, for each 15 minutes of the day. The data can, as an example, be dot delimited. In such a configuration, and again as an example embodiment, the first part of the data can be a file version number, with the second data segment being the serial number of the gateway 410. A third segment of the data can be an identification for the device 404 from which the energy data was transmitted. The fourth segment of the data can define the type of data which is being provided (i.e. energy). The fifth segment can be the energy data itself, and the sixth segment can be a UTC time stamp.

With respect to the smart devices 404, it was previously stated that such devices could be in the form of dimmable relays for purposes of controlling an increase or decrease in light intensity for loads in the form of dimming lights. It should also be emphasized that the smart devices 404 can be utilized for various other types of energy loads. Such loads can include switches, scene controllers, occupancy sensors and the like. Such devices and loads provide users with the capability of enabling or disabling the loads in their entireties.

Figure 12:
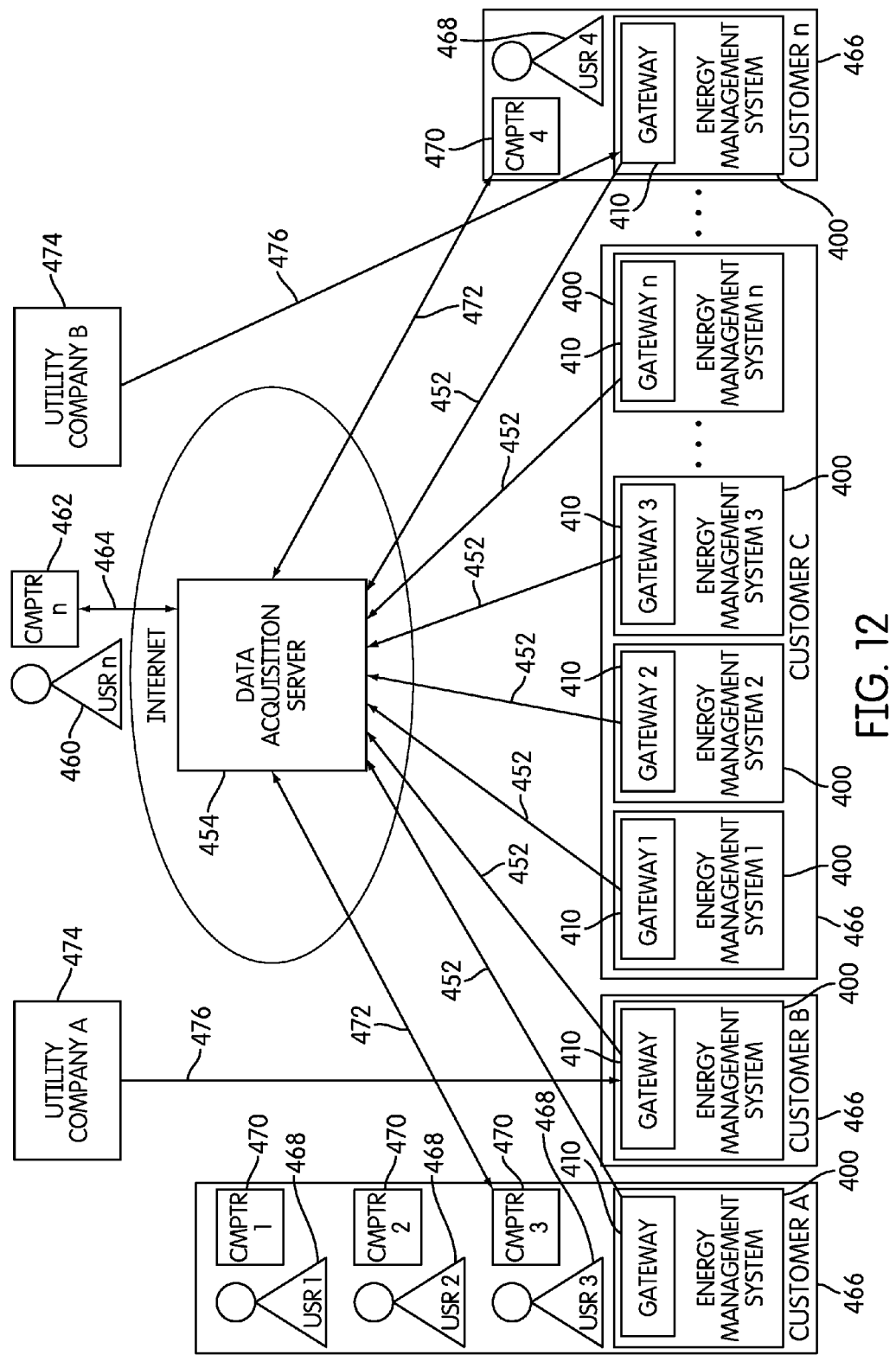
FIG. 12 is a block diagram showing various communications and functional relationships among energy management systems and a data acquisition server in accordance with the invention.

Additional details regarding the energy management system 400 in accordance with the invention and its use with the data acquisition server 454 are illustrated in FIG. 12. As shown therein, the data acquisition server 454 can be in the form of a web server which essentially "sits out" on the internet, and maintains the database of energy and occupancy data from all customers with installed energy management systems 400. As partially illustrated in FIG. 11, FIG. 12 illustrates the concept of a series of energy management systems 400 having gateways 410, which transmit data to the data acquisition server 454 over internet paths 452. The data acquisition server 454 can be characterized as hosting or executing software applications that can be accessed and interact with users or customers, through the use of a computer with an internet connection. Such a user is shown as user 460 having a computer 462 which communicates with the data acquisition server 454 through internet path 464.

FIG. 12 also illustrates a series of customers 466, which are individually identified as customers A, B, C . . . n. Each of the customers 466 is a customer having an installed energy management system 400 with one or more gateways 410. For example, customer C is illustrated as having multiple energy management systems 400. It should be noted that each of the energy management systems 400 may be installed in one or more customer sites, with each system 400 having at least one gateway 410.

FIG. 12 also illustrates a series of users 468, each with a computer 470. The computers 470 can interact with the data acquisition server 454 through internet paths 472. In a particular embodiment, the users do not necessarily need to be at a customer's site for purposes of accessing or interacting with the data acquisition server 454. Instead, users can be located at a remote site, so long as they have access to computer 470 having an internet path connection 472.

FIG. 12 also illustrates communication capability with utility companies, identified as utility companies 474, consisting of utility company A and utility company B. The utility companies 474 are shown as having communication paths 476 which connect to selected gateways 410 of various customers. With one embodiment, the interaction provided by the communication paths 476 can be in the form of requests for changes to the customer's energy consumptions. A request of such a nature to the gateways 410 can trigger load shedding and load balancing events to occur within the energy management systems 400.

It should also be noted that another embodiment can include an alternative version where server software applications are provided directly to customers, so as to allow the customers to host on a server located on the customer's premises. Such an embodiment could be utilized in situations of relatively high security, where the customer does not wish to have internet connections to the customer's facilities and potential access to customer intranet.

General concepts associated with the embodiments of energy management systems in accordance with the invention as illustrated in FIGS. 10, 11 and 12 will now be described. In an example embodiment, the data acquisition server 454 can store 15 minute readings from each device 404 connected to a particular customer gateway 410 within a data base. When a customer wishes to view the energy consumption of various devices, rooms, zones, floors or buildings, the customer can log into a website with a security identification and password, provided by the website owner. The customer may then not only view energy consumption for their lighting, plug loads, HVAC, etc., but also are able to compare consumption to any particular standard selected by the customer. Such a standard could be a standard typically referred to as an ASHRAE (American Society of Heating, Refrigerating and Air Conditioning Engineers) standard. The customer also has the ability to define their own standards. Still further, the customer could run reports from the website which would allow the customer to compare energy consumption and occupancy information across different rooms, zones, floors and buildings.

Various concepts associated with load shedding and dynamic load balancing will now be described. Load shedding can be characterized as an event which occurs when a new, lower total energy consumption level is set, and the energy management system 400, in response, will begin to "trim" the energy consumption of the loads 408 connected to the devices 404 to achieve the desired consumption levels. A new energy consumption level (which can be characterized as a goal or target) can be set in various ways. As an example, scheduled events can be created by the customer within a corresponding gateway 410. Also, an immediate request by the customer can be provided through the gateway 410. In addition, an immediate request by the customer's energy provider (or utility company) can be set, based on a chosen standard (such as ASHRAE) for which the customer wishes to maintain adherence. The length of time that the new energy level is held can be specified by the party which sets or initiates the load shedding event.

Decrease in the energy consumption within the energy management systems 400 can occur in several ways. For example, and in accordance with one embodiment of the invention, the smart devices 404 which have dimming capabilities (and are connected to dimmable light fixtures) can decrease energy consumed by their loads 408 dimming the light fixtures. For example, if a dimmable device 404 is instructed to decrease the corresponding load energy usage by 10%, the device 404 can dim the light fixture until it detects that it has achieved the new energy level. Within the smart device, the process can include the core board 450 receiving a load shedding message which pertains to a priority group of which it is a member. The message can be in the form of the energy goal for that particular priority group, and it can be passed from the core board 450 to the energy monitor boards 448. The energy monitor boards 448 can speed up their energy readings from, for example, one minute to two seconds, but still report the one minute active energy information up to the core board 450 for the gateway 410 to accumulate, and to then send to the data acquisition server 454. The energy monitor board 448 can request that the core board 450 increase or decrease its dimming output so as to achieve the energy goal. When the energy monitor board 448 detects that the energy goal has been reached, transmissions can occur so as to inform the core board 450 that the board 450 can inform the gateway 410 of the fact that the target has been reached, and the new dimming level. The energy monitor boards 448 can then remain in this operating mode, until the gateway 410 sends messages over the network informing all devices that the load shedding period has ended. The core board 450 can then return the dimming level of the light fixture back to its original state, and the energy monitor board 448 can go back to taking energy readings on a per minute basis. As a further example, if the device 404 has its light fixture load 408 at 90% brightness, and then during load shedding the device 404 will dim its light fixtures to 65% brightness, the device will bring the light fixture back up to 90% brightness when the load shedding event has ended.

Devices 404 which are associated with loads 408 which do not have dimming capabilities can only increase or decrease energy consumption by the loads 408 by turning internal relays on or off. If the devices 404 are included within a priority group which is involved in the load shedding, they will enable or disable the loads 408 depending upon the direction desired for energy consumption increase or decrease. When the load shedding event ends, the device 404 will return the load 408 to the previous state.

Dynamic balancing occurs when, during a load shedding event, other lights or other devices are turned on (bringing the energy level back up over the new energy target level). In response, the energy management system can restart the process of trimming energy consumption (dimming lights and/or turning off lights and other devices) to return back to the target energy level. Correspondingly, if energy is removed from the system during a load shedding event (bringing the energy level below the target energy level), the system can respond by adding energy consumption (i.e. brightening lights and/or enabling lights and other devices). Accordingly, once an energy level target is set, the energy management systems 400 in accordance with the invention will increase and decrease energy consumption, so as to stay as close as possible to the target.

Load shedding and dynamic load balancing can be characterized as being accomplished through a series of messages passed through the gateways 410 and the various devices 404 within the system. As previously described, in one embodiment, each device 404 can send a message over the network each minute, identifying the active energy consumption for the past minute. Accordingly, the gateways 410 "know" the current energy consumption of each of the loads 408 connected to the devices 404 within the system. When a load shedding event is executed, the gateways 410 can transmit messages to one or more priority groups, informing the groups that they need to either increase or decrease their energy consumption by a specific amount of watt hours or percent of watt-hours so as to achieve the chosen energy target.

In one embodiment of the invention, the load shedding and dynamic load balancing require that the devices 404 be associated with a priority group. A priority group can be characterized as a number assigned to one or more devices 404. During load shedding and dynamic load balancing, the gateways 410 can transmit messages to the priority groups so as to adjust energy consumption levels. Priority group one can be characterized as the first group to receive load change requests, relating to increase or decrease of energy consumption during load shedding and dynamic load balancing. If the change of energy consumption level in priority group one does not sufficiently affect the system's total energy consumption sufficiently so as to meet the energy level target, then the gateways 410 can send load change request messages to priority group two. This process can continue until energy level targets are achieved. The devices 404 can handle a plurality of priority groups. However, in accordance with certain aspects of the invention, the devices 404 do not need to be assigned to a particular priority group. However, if a device 404 is not assigned to a priority group, then it is assumed that the device is not to partake in load shedding events. As a result, the device 404 will not change its load level during load shedding and dynamic balancing. This is useful to a customer if there are critical light fixtures or other loads that need to be maintained in a particular state at all times.

Figure 13:
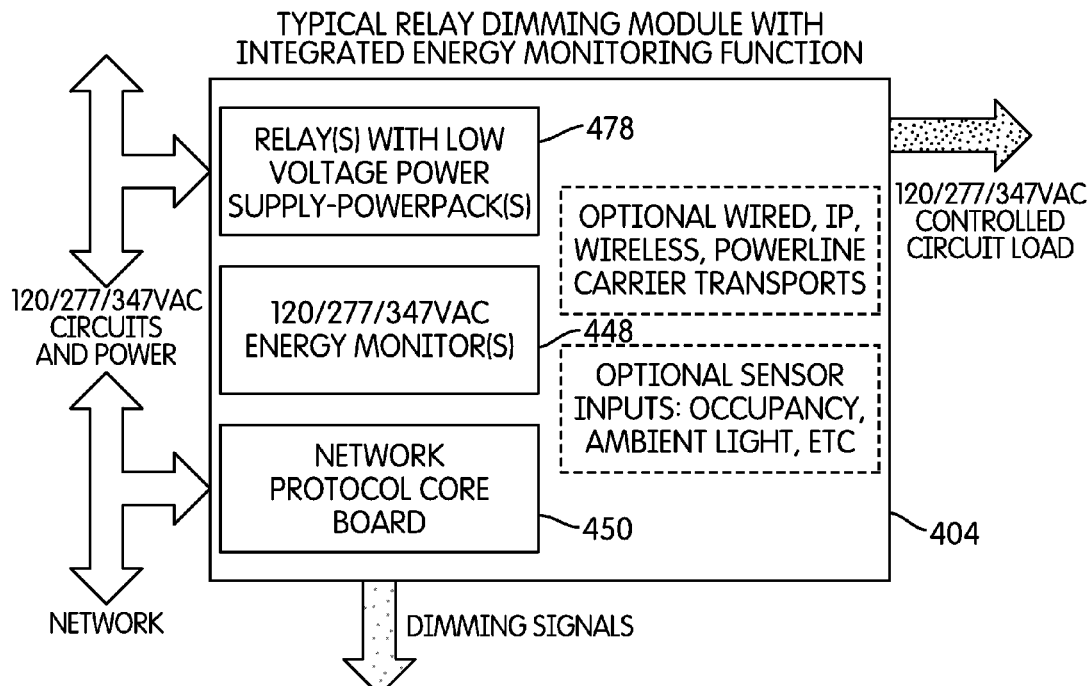
FIG. 13 is a block diagram illustrating a relay dimming module having an integrated energy monitoring function in accordance with the invention.

For purposes of further understanding of example embodiments of the invention. FIG. 13 illustrates a relay dimming module 404 having integrated energy monitoring functions in accordance with the invention. As shown in FIG. 13, relays are provided with low voltage power supplies. Energy monitor boards 448 and a core board 450 are also provided. Communications can be provided optionally through a wire, IP, wireless or power line carrier transports. Optional sensor inputs can include occupancy, ambient light and various other inputs. Control circuit loads can be at various voltages. The relay dimming module 404 can be utilized for distributed zone control with energy monitoring. Multiple relays 478 and energy monitors 448 can be utilized. The module 404 can control and monitor lighting loads as well as plug loads and other miscellaneous loads in a commercial workspace environment. Currently, the approach that is often used in the market place is for energy monitoring at a circuit panel. Systems in accordance with certain aspects of the invention are unique in that zone level control and usage/monitoring are coupled together, so as to achieve improved energy optimization in a commercial building space.

Figure 14:
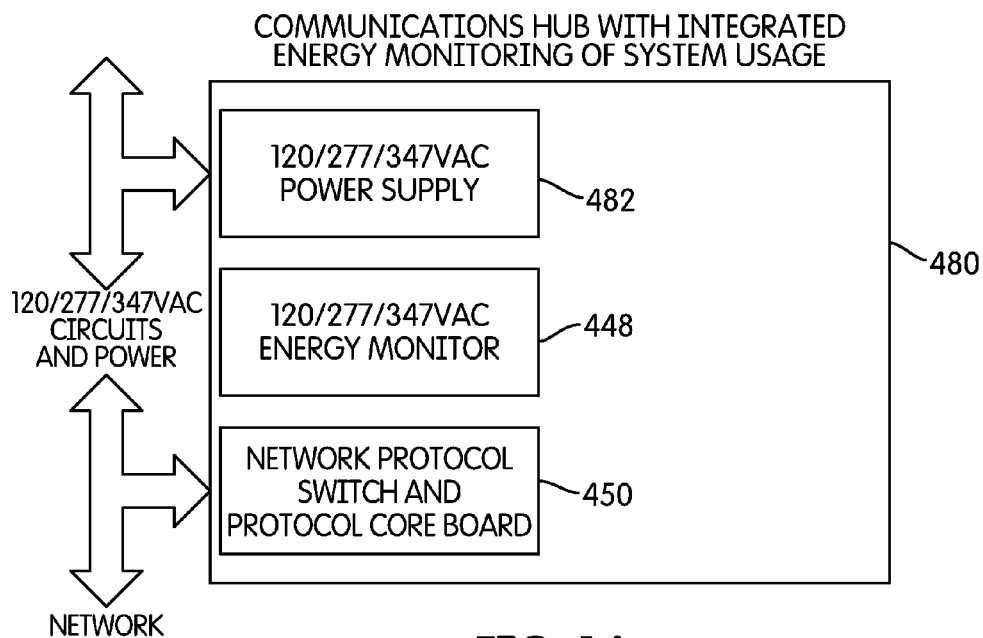
FIG. 14 is a block diagram of a communications hub having integrated energy monitoring of system usage in accordance with the invention.

FIG. 14 illustrates a communications hub 480 having integrated energy monitoring of system usage. The hub 480 includes power supply 482, at least one energy monitor 448 and one core board 450. The switch in the form of the communications hub 480 can incorporate energy monitoring so as to provide real time energy usage of control systems accessory devices power usage. Known control systems calculate their consumptions based on estimates. In accordance with certain aspects of the invention, the systems in accordance with the invention will accurately show energy usage of not only commercial work spaces, but also the control systems themselves.

Figure 15:
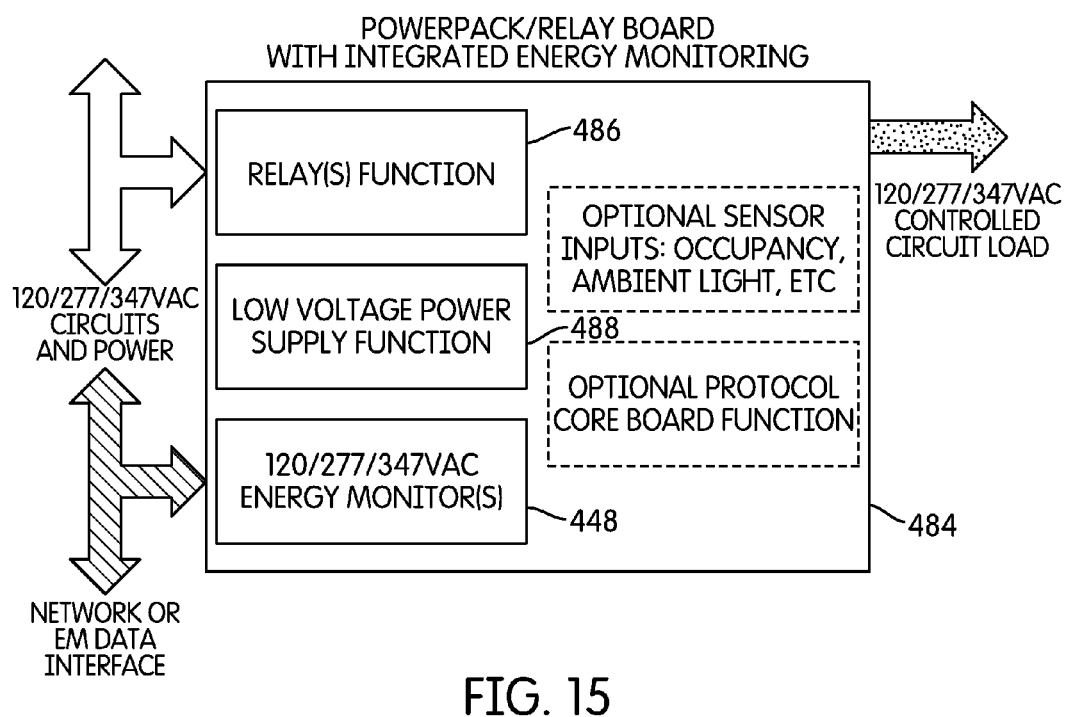
FIG. 15 is a block diagram of a relay board having integrated energy monitoring in accordance with the invention.

FIG. 15 illustrates a relay board 484, having integrated energy monitoring. The board includes relay functions 486, low voltage power supply functions 488, and energy monitor boards 448. Optional sensor inputs include occupancy, ambient light and the like. There can also be an optional function associated with a core board 450. By integrating high voltage relay functions of common sensor packs with energy monitoring and protocol/signal interfacing, an ability is provided to readily upgrade existing control installations which use sensor power packs. This upgrade will provide for energy monitoring and data logging by means of control systems in accordance with the invention. Multiple relay energy monitoring boards 448 can be designed so as to refine and optimize the relay dimmer modules.

It will be apparent to those skilled in the pertinent arts that other embodiments of energy management systems in accordance with the invention may be designed. That is, the principles of energy management systems in accordance with the invention are not limited to the specific embodiments described herein. Accordingly, it will be apparent to those skilled in the art that modifications and other variations of the above-described illustrious embodiments of the invention may be effected without departing from the spirit and scope of the novel concepts of the invention.

The invention claimed is:

1. An energy management system for monitoring and controlling energy consumption of a facility, the energy management system comprising:
   a plurality of loads;
   a plurality of smart devices in communication with the plurality of loads, wherein each smart device is configured to control energy consumption of one or more loads associated with the each smart device and to measure active energy consumed by the associated one or more loads; and
   a gateway in communication with the plurality of smart devices, wherein the gateway is configured to:
      associate a load zone with at least one smart device and with one or more loads associated with the at least one smart device,
      associate each smart device of the load zone with load shedding properties,
      define a load shedding event that, in response to a trigger condition, reduces energy consumption of the load zone by reducing energy consumption of the loads associated with the each smart device of the load zone according to the load shedding properties, and
      communicate instructions to the each smart device of the load zone to reduce energy consumption of the loads associated with the each smart device of the load zone according to the load shedding properties, to implement the load shedding event when the trigger condition is met,
   wherein each smart device is configured to, in response to an instruction from the gateway to reduce energy consumption to implement the load shedding event:
      decrease energy consumption of the associated one or more loads,
      periodically measure the active energy consumed by the associated one or more loads while decreasing the energy consumption of the associated one or more loads, and
      discontinue decreasing the energy consumption of the associated one or more loads when the each smart device measures an active energy consumption of the associated one or more loads that matches a desired target energy consumption of the load shedding properties of the each smart device,
   wherein before the load shedding event the each smart device periodically measures the active energy consumed by the associated one or more loads at a first frequency,
   wherein the each smart device is further configured to, in response to the instruction from the gateway to reduce energy consumption to implement the load shedding event:
      periodically measure at a second frequency higher than the first frequency, the active energy consumed by the associated one or more loads while decreasing the energy consumption of the associated one or more loads, and
      when the each smart device measures an active energy consumption of the associated one or more loads that matches the desired target energy consumption of the load shedding properties of the each smart device, return to periodically measuring the active energy consumed by the associated one or more loads at the first frequency,
   wherein before the load shedding event the each smart device stores in computer memory each of the active energy consumed measurements at the first frequency, and
   wherein during the load shedding event the each smart device periodically measures the active energy consumed at the second higher frequency, but continues to store in computer memory each of the active energy consumed measurements at the first frequency.

2. The energy management system of claim 1, wherein the load zone includes a first smart device and a second smart device, and wherein the first smart device and the second smart device are powered by different circuit panels, are operable independently from each other, and are operable with or without a master control module.

3. The energy management system of claim 1, wherein the load shedding properties include a priority of load shedding relative to other devices and loads, a size of load level change, a method by which to change load level, a maximum load setting, and a minimum load setting.

4. The energy management system of claim 1, wherein the gateway provides a user interface configured to receive information from a user associating the smart devices with the loads, associating the load zone with the at least one smart device and the one or more loads associated with the at least one smart device, associating the each smart device of the load zone with load shedding properties, and defining the load shedding event.

5. The energy management system of claim 1, wherein each smart device comprises:
   an energy monitoring computer processor that monitors active energy consumed by loads controlled by the each smart device; and
   a core computer processor in communication with the energy monitoring computer processor and the gateway, wherein the core computer processor receives, from the energy monitoring computer processor, energy consumption data of the loads controlled by the each smart device, accumulates the energy consumption data, and periodically forwards the accumulated energy consumption data to the gateway,
   wherein the gateway receives and stores the accumulated energy consumption data for multiple smart devices, and
   wherein the energy management system further comprises a data acquisition server in communication with the gateway over a global computer network, wherein the data acquisition server periodically receives and stores the accumulated energy consumption data from the gateway over the global computer network, and stores the accumulated energy consumption data along with accumulated energy consumption data from other gateways.

6. The energy management system of claim 1, wherein during the load shedding event, the gateway:
   receives at the first frequency from the each smart device the measured active energy consumption and determines a system energy consumption, in response to an increase in the system energy consumption, transmits new instructions to reduce energy consumption to return back to a target energy level, and in response to a decrease in the system energy consumption, transmits new instructions to increase energy consumption to return back to the target energy level.

7. The energy management system of claim 1, wherein the trigger condition comprises at least one of a time condition, a date condition, a weather condition, a user occupancy condition, an ambient light condition, a user request, and an energy provider request.

8. The energy management system of claim 1, wherein the gateway is configured to receive active energy consumption data from a plurality of smart devices that are distributed across different circuit panels and grouped in a plurality of prioritized load zones, and to transmit a message to a single priority load zone of the smart devices, instructing the single priority load zone to modify its active energy consumption of the single priority load zone to achieve a desired energy target.

9. The energy management system of claim 1, wherein one or more loads of the plurality of loads comprise dimmable light fixtures.

10. The energy management system of claim 1, wherein the each smart device periodically sends a message to the gateway identifying active energy consumption of a past increment of time for the each smart device, wherein in implementing the load shedding event, the gateway consults the active energy consumption of the past increment of time for the each smart device and based on the active energy consumption of the past increment of time, instructs the each smart device to increase or decrease energy consumption of the each smart device by a specific amount so as to achieve the desired target energy consumption.

11. The energy management system of claim 1, wherein the load shedding properties comprise a priority group designation, wherein the plurality of smart devices includes a first group of smart devices associated with a first priority group designation and successive groups of smart devices associated with successive priority group designations, wherein during a load shedding event, the gateway:
first sends the instruction to reduce energy consumption to the first group of smart devices and not to the successive groups of smart devices, and
when a resulting change in energy consumption of the first group of smart devices does not sufficiently affect a system's total energy consumption so as to meet a system energy level target, sends the instruction to reduce energy consumption to a next successive group of smart devices and continues to send the instruction to additional successive groups of smart devices until the system energy level target is achieved.

12. An energy management system for monitoring and controlling energy management of a series of load zones, each of the load zones having energy consumption devices associated therewith, and with the energy consumption devices receiving power from an incoming power source, the energy management system comprising:

a series of smart devices, wherein each smart device is in communication with a load zone of the series of load zones, and wherein each smart device is configured to obtain device-identifying data and active power usage data associated with energy consumption devices associated with the each smart device and to control energy consumption of the associated energy consumption devices;

a gateway in communication with the series of load zones, wherein the gateway is configured to:
receive from the series of smart devices active energy usage data of the energy consumption devices within the respective load zones of the smart devices, wherein the active energy usage data comprises data relating to specific active energy data consumption of individual ones of the energy consumption devices;
provide to a user through a user interface the active energy usage data;
receive from the user through the user interface instructions for causing selected ones of a set of functional operations to be performed by the gateway; and
transmit energy usage controlling data to the series of smart devices, wherein the energy usage controlling data transmitted to the series of smart devices comprises data for controlling power consumption of individual ones of the energy consumption devices, wherein each smart device is configured to, in response to energy usage controlling data from the gateway to reduce energy consumption to implement a load shedding event:
decrease energy consumption of the associated energy consumption devices,
periodically measure active energy consumed by the associated energy consumption devices while decreasing the energy consumption of the associated energy consumption devices, and
discontinue decreasing the energy consumption of the associated energy consumption devices when the each smart device measures an active energy consumption of the associated energy consumption devices that matches the energy usage controlling data to implement the load shedding event, wherein before the load shedding event the each smart device periodically measures the active energy consumed by the associated energy consumption devices at a first frequency, wherein the each smart device is further configured to, in response to the energy usage controlling data from the gateway to reduce energy consumption to implement the load shedding event:
periodically measure at a second frequency higher than the first frequency, the active energy consumed by the associated energy consumption devices while decreasing the energy consumption of the associated energy consumption devices, and
when the each smart device measures an active energy consumption of the associated energy consumption devices that matches the energy usage controlling data to implement the load shedding event, return to periodically measuring the active energy consumed by the associated energy consumption devices at the first frequency, wherein before the load shedding event the each smart device stores in computer memory each of the active energy consumed measurements at the first frequency, and wherein during the load shedding event the each smart device periodically measures the active energy consumed at the second higher frequency, but continues to store in computer memory each of the active energy consumed measurements at the first frequency.

13. The energy management system of claim 12, wherein the active energy usage data received by the gateway from the series of smart devices comprises data representative of average loads of individual ones of the energy consumption devices.

14. The energy management system of claim 12, wherein the gateway is configured to perform load targeting operations and to transmit data relating to the load targeting operations of selected ones of the energy consumption devices.

15. The energy management system of claim 12, wherein the gateway is configured to perform functional operations relating to load shedding,
   wherein the load shedding operations are performed in response to energy consumption data received from multiple different combinations of the energy consumption devices in a distributed network and instruction data received from the user through the user interface,
   wherein the gateway includes a load shedding storage database for storing device-identifying data and active energy consumption data,
   wherein the gateway is configured to transmit the device-identifying data and the active energy consumption data for visual display on the user interface,
   wherein the visual display comprises identification and label information, specific communications path then being viewed by the user, number of energy consumption devices within a particular one of the load zones, kilowatt/hours then currently being consumed within a particular one of the load zones, and average load level of selected ones of the energy consumption devices,
   wherein the gateway is configured to enable the user to generate data for editing energy properties of selected ones of the energy consumption devices, and to control output levels of selected ones of the energy consumption devices, and
   wherein the gateway is configured to visually indicate to the user maximum load levels to which selected ones of the energy consumption devices are to be restricted.

16. The energy management system of claim 12, wherein the energy consumption devices comprise a dimmer, wherein functional operations performed by the gateway comprise dimmer functional operations, and wherein data representative of energy-related activities of the dimmer made visually available to the user through the user interface comprise:
   calculation of the actual amount of energy the dimmer is consuming;
   identification of a group number used by a load shedding goal engine of the dimmer, so as to determine in which order the dimmer's load level should be modified by the load shedding goal engine;
   use of load shedding gain to determine a size of the load level change implemented by the load shedding goal engine;
   selection of criteria by the user, to be used by the load shedding goal engine for dimming the dimmer;
   a maximum load shedding setting for determining the dimmer's maximum load level; and
   a minimum load shedding setting for permitting the user to set the dimmer's lowest load level during a load shedding event,
   wherein the functional operations performed by the gateway comprise a calculation of power consumption and transmission of instruction signals to selected ones of the energy consumption devices so as to dim all ambient light, or to disable ambient light in total, and
   wherein the functional operations performed by the gateway comprise transmission of polling signals to selected ones of energy consumption devices comprising occupancy sensors, so as to determine occupancy of selected work stations.

17. The energy management system of claim 16, wherein the functional operations further comprise activation of task lights only within ones of the selected ones of the work stations that have been determined to be currently occupied.

18. The energy management system of claim 12, wherein during the load shedding event, the gateway:
   receives from the each smart device the measured active energy consumption and determines a system energy consumption,
   in response to an increase in the system energy consumption, transmits new energy usage controlling data to reduce energy consumption to return back to a target energy level, and
   in response to a decrease in the system energy consumption, transmits new energy usage controlling data to increase energy consumption to return back to the target energy level.

19. The energy management system of claim 12, further comprising a global gateway controller for performing functions associated with calculation of energy consumption data, and passing the energy consumption data onto a web server,
   wherein the global gateway controller is configured to:
      register with the web server, for purposes of maintaining separation of data;
      transmit information regarding a hierarchy structure to the web server, so that if the user removes a load zone from the hierarchy, related data in the web server can then be disabled;
      transmit load level information to all nodes that are reporting load level changes on a line-by-line basis, so that the load level information can be stored in a device table in a database for later usage by a reporting tool; and
      transmit all device energy usage data, on a periodic basis, to the web server, wherein the web server maintains an energy table receiving updates associated with the energy usage data, and wherein the web server uses an engine that continuously executes by using a current energy table for purposes of generating an energy log.

20. The energy management system of claim 19, wherein:
   the user is required to register for services performed by the global gateway controller, and connects a web browser of the user to the web server, for purposes of synchronization;
   when linked, the user has a functional capability of logging into the web server, and viewing information comprising at least one of tables and bar graphs;
   the functional operations performed by the global gateway controller and the server comprise identification of locations, with the user being able to receive information regarding at least one of total energy, energy by zone, and energy by device type; and
   the user has the capability of performing a comparison function, which permits the user to select a guideline for purposes of rationalization of data, in the form of at least one of day, week, month, and priority group.

* * * * *